US011234166B2

(12) United States Patent
McFarland et al.

(10) Patent No.: US 11,234,166 B2
(45) Date of Patent: Jan. 25, 2022

(54) DYNAMIC FREQUENCY SELECTION IN DISTRIBUTED WI-FI NETWORKS

(71) Applicant: Plume Design, Inc., Palo Alto, CA (US)

(72) Inventors: William McFarland, Portola Valley, CA (US); Paul White, Burlingame, CA (US); Yoseph Malkin, San Jose, CA (US); Janusz Dziedzic, Swidnica (PL); Mojmir Tuljak, Logatec (SI); Soner Ozgur, San Ramon, CA (US); Michal Kazior, Wroclaw (PL)

(73) Assignee: Plume Design, Inc., Palo Alto, CA (US)

( * ) Notice: Subject to any disclaimer, the term of this patent is extended or adjusted under 35 U.S.C. 154(b) by 62 days.

(21) Appl. No.: 16/403,190

(22) Filed: May 3, 2019

(65) Prior Publication Data

US 2019/0342795 A1 Nov. 7, 2019

Related U.S. Application Data

(60) Provisional application No. 62/667,397, filed on May 4, 2018.

(51) Int. Cl.
*H04W 28/18* (2009.01)
*H04W 16/14* (2009.01)
(Continued)

(52) U.S. Cl.
CPC ........... *H04W 28/18* (2013.01); *H04W 16/14* (2013.01); *H04W 24/08* (2013.01); *H04W 24/10* (2013.01); *H04W 84/12* (2013.01)

(58) Field of Classification Search
CPC . H04W 16/14; H04W 84/12; H04W 72/0453; H04W 72/082; H04W 24/08;
(Continued)

(56) References Cited

U.S. PATENT DOCUMENTS

2013/0194944 A1 8/2013 Soyak et al.
2015/0016362 A1* 1/2015 Negus ................... H04W 72/04
370/329

(Continued)

FOREIGN PATENT DOCUMENTS

EP 2512169 A1 10/2012
WO 2017-039910 A1 3/2017

OTHER PUBLICATIONS

Aug. 19, 2019, International Search Report issued for International Application No. PCT/US2019/030590.

*Primary Examiner* — Sai Aung
(74) *Attorney, Agent, or Firm* — Clements Bernard Baratta; Lawrence A. Baratta, Jr.; Jacob P. Beers

(57) ABSTRACT

A Wi-Fi system includes a plurality of access points each configured to operate on a plurality of channels including Dynamic Frequency Selection (DFS) frequency channels and non-DFS frequency channels; and at least one access point of the plurality of access points is connected to a controller, wherein the controller is configured to coordinate usage of the plurality of channels between the plurality of access points including usage of the DFS frequency channels pursuant to predetermined DFS rules. One or more access points of the plurality of access points are configured to perform DFS measurements for a Channel Availability Check (CAC) and the DFS measurements are provided to the controller.

18 Claims, 14 Drawing Sheets

(51) Int. Cl.
*H04W 24/08* (2009.01)
*H04W 24/10* (2009.01)
*H04W 84/12* (2009.01)

(58) Field of Classification Search
CPC . H04W 24/02; H04W 72/0406; H04W 72/02; H04W 36/06
See application file for complete search history.

(56) References Cited

U.S. PATENT DOCUMENTS

| | | |
|---|---|---|
| 2017/0063665 A1* | 3/2017 | Casebolt ............. H04W 72/082 |
| 2017/0149636 A1* | 5/2017 | Yu .......................... H04W 24/02 |
| 2017/0280479 A1* | 9/2017 | Frenne ................. H04W 48/16 |
| 2017/0325210 A1* | 11/2017 | Green ................ H04W 72/0453 |
| 2018/0014205 A1 | 1/2018 | Tsai et al. |
| 2018/0014317 A1* | 1/2018 | Gulati ................... H04L 5/0005 |
| 2018/0054739 A1 | 2/2018 | Dutta et al. |
| 2018/0212827 A1* | 7/2018 | Eryigit ................. H04W 16/18 |
| 2019/0246324 A1* | 8/2019 | Cizdziel ............ H04W 36/0088 |

* cited by examiner

DYNAMIC FREQUENCY SELECTION IN DISTRIBUTED WI-FI NETWORKS

CROSS-REFERENCE TO RELATED APPLICATIONS

The present disclosure claims priority to U.S. Provisional Patent No. 62/667,397, filed May 4, 2018, and entitled "Dynamic frequency selection in distributed Wi-Fi networks," the contents of which are incorporated by reference herein.

FIELD OF THE DISCLOSURE

The present disclosure generally relates to wireless networking systems and methods. More particularly, the present disclosure relates to Dynamic Frequency Selection in distributed Wi-Fi networks.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Dynamic Frequency Selection (DFS) may be applied in Wi-Fi networks with adjacent access points. The access points can automatically select frequency channels with low interference levels. DFS is supported by the IEEE 802.11h-2003, the contents of which are incorporated by reference. Also, DFS is also mandated in the 5470-5725 MHz Unlicensed National Information Infrastructure (U-NII) band for radar avoidance. Regulatory requirements are limiting the number of frequency channels (e.g., 5 GHz channels) that are available or placing additional restrictions on their use because this spectrum is shared with other technologies or services. Wi-Fi networks operating in those bands are required to employ a radar detection and avoidance capability. The IEEE 802.11h standard addresses this requirement by adding support for DFS and Transmit Power Control (TPC) on every DFS channel. In the context of Wi-Fi, an Access Point (AP) that supports DFS must be able to detect radar signals during the channel start-up and in-service. If radar signals are detected, the AP stops transmitting and then selects a new channel. Once the new channel is selected, the AP informs nearby clients to clear the channel and move to a different frequency by including the Channel Switch Announcement IE in the beacon frame. DFS-compatible Wi-Fi clients, on the other hand, cannot start transmitting until authorized by the AP and cannot perform active scanning (i.e., transmit probe requests) until Wi-Fi activity from nearby APs is detected. They also must be able to clear a channel when commanded by the AP.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to Dynamic Frequency Selection in distributed Wi-Fi networks. In an embodiment, the systems and methods can be implemented in a distributed Wi-Fi system such as a multiple access point system, a mesh system, an access point and repeater(s) system, etc. The systems and methods relate to improved DFS techniques leveraging multiple nodes in a distributed Wi-Fi system as well as cloud-based control.

Distributed Wi-Fi System

Figure 1:
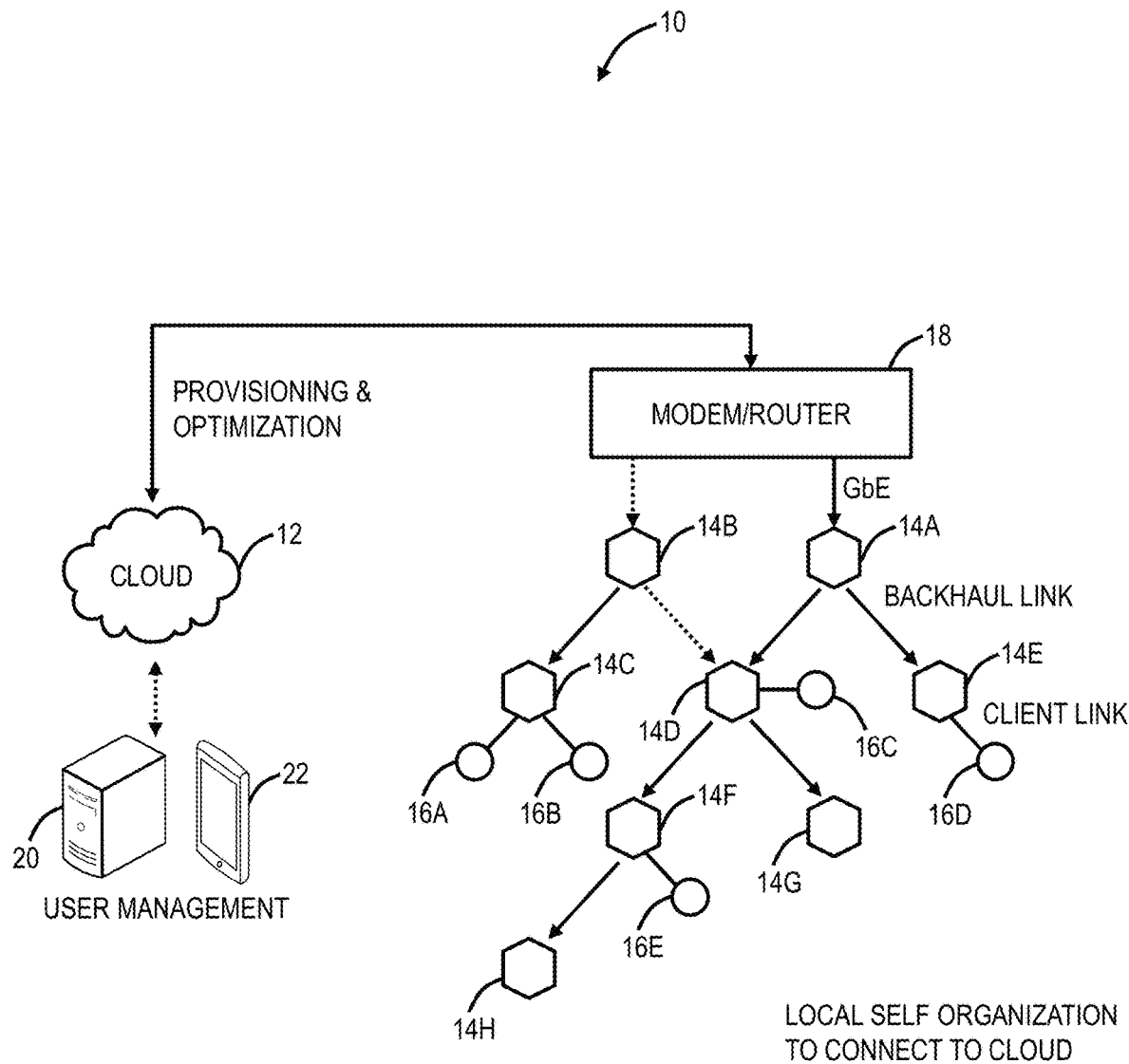
FIG. 1 is a network diagram of a distributed Wi-Fi system with cloud-based control.

FIG. 1 is a network diagram of a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 can be a cloud-based controller configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on a local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
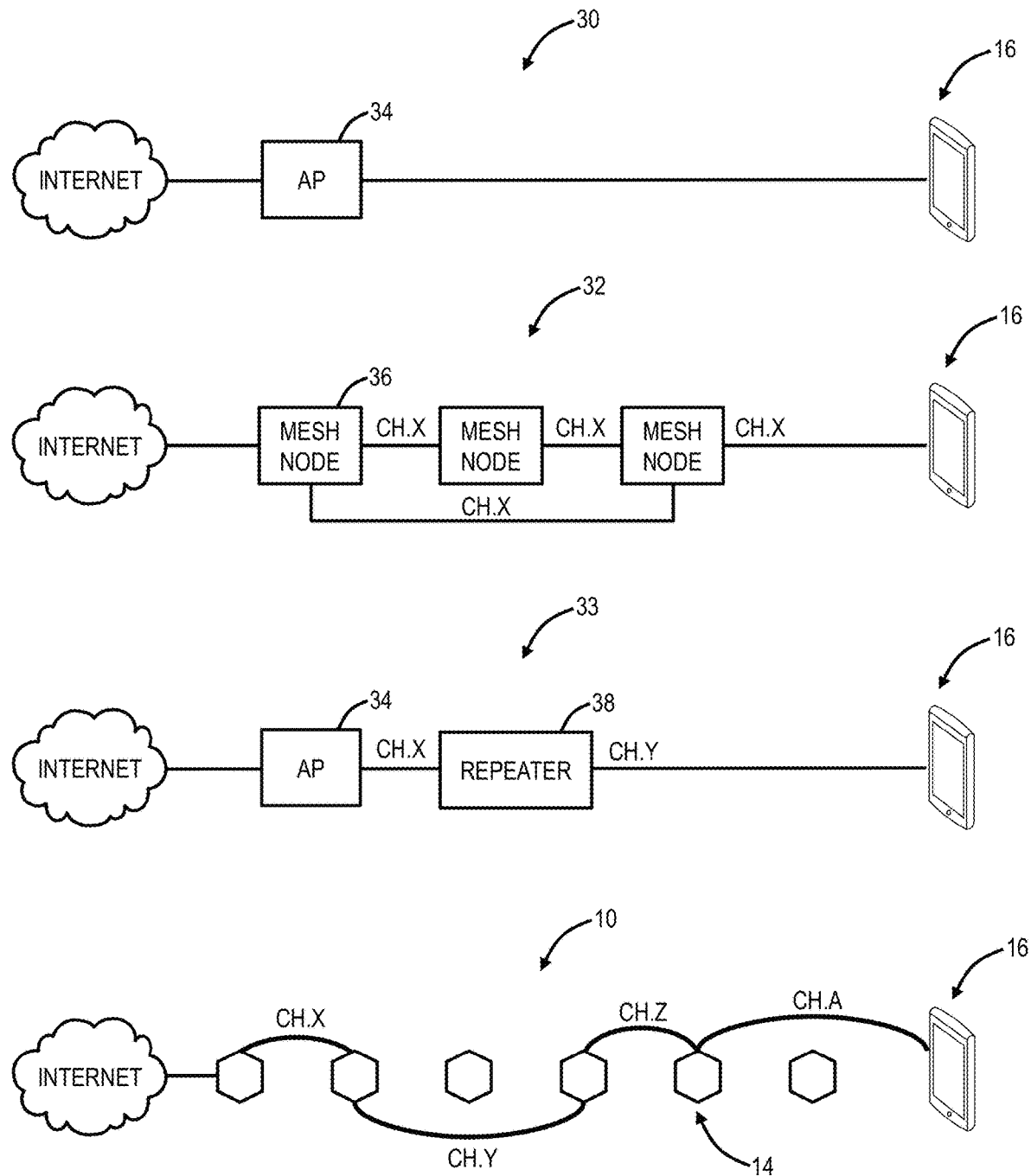
FIG. 2 is a network diagram of differences in operation of the distributed Wi-Fi system of FIG. 1 relative to a conventional single access point system, a Wi-Fi mesh network, and a Wi-Fi repeater system.

FIG. 2 is a network diagram of differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Ch. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an aspect, the servers 20 in the cloud 12 are configured to optimize channel selection for the best user experience.

Of note, the systems and methods described herein contemplate operation through any of the distributed Wi-Fi system 10, the single access point system 30, the Wi-Fi mesh network 32, and the Wi-Fi repeater network 33. There are certain aspects of the systems and methods which require multiple device Wi-Fi networks, such as the distributed Wi-Fi system 10, the Wi-Fi mesh network 32, and the Wi-Fi repeater network.

Access Point

Figure 3:
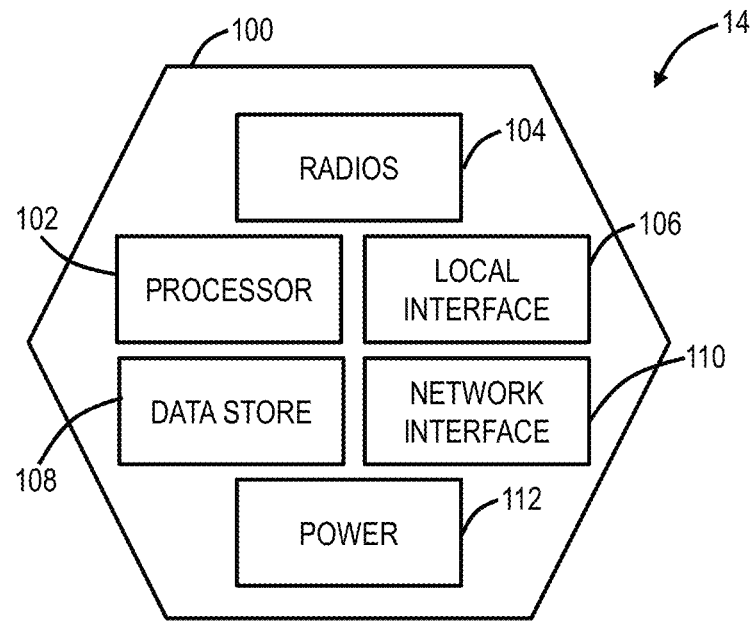
FIG. 3 is a block diagram of functional components of the access point in the distributed Wi-Fi system of FIG. 1.

FIG. 3 is a block diagram of functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 3 depicts the access point 14 in an oversimplified manner, and a practical embodiment may include additional components and suitably configured processing logic to support features described herein or known or conventional operating features that are not described in detail herein.

In an embodiment, the form factor 100 is a compact physical implementation where the access point 14 directly plugs into an electrical socket and is physically supported by the electrical plug connected to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an embodiment, the access points 14 support dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an embodiment, all of the access points 14 in the distributed Wi-Fi system 10 include the network interface 110. In another embodiment, select access points 14 which connect to the modem/router 18 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 4:
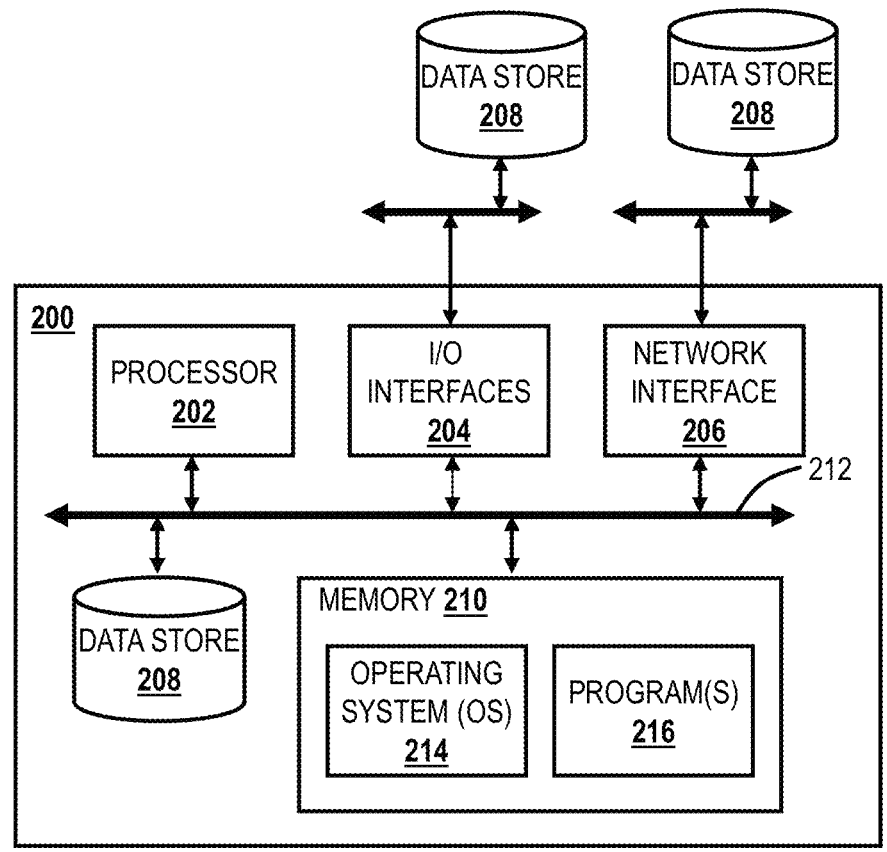
FIG. 4 is a block diagram of functional components of a server, a Wi-Fi client device, or a user device which may be used with the distributed Wi-Fi system of FIG. 1.

FIG. 4 is a block diagram of functional components of the server 20, the Wi-Fi client device 16, or the user device 22 which may be used with the distributed Wi-Fi system 10. FIG. 4 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

DFS—Radar Detection

Figure 5:
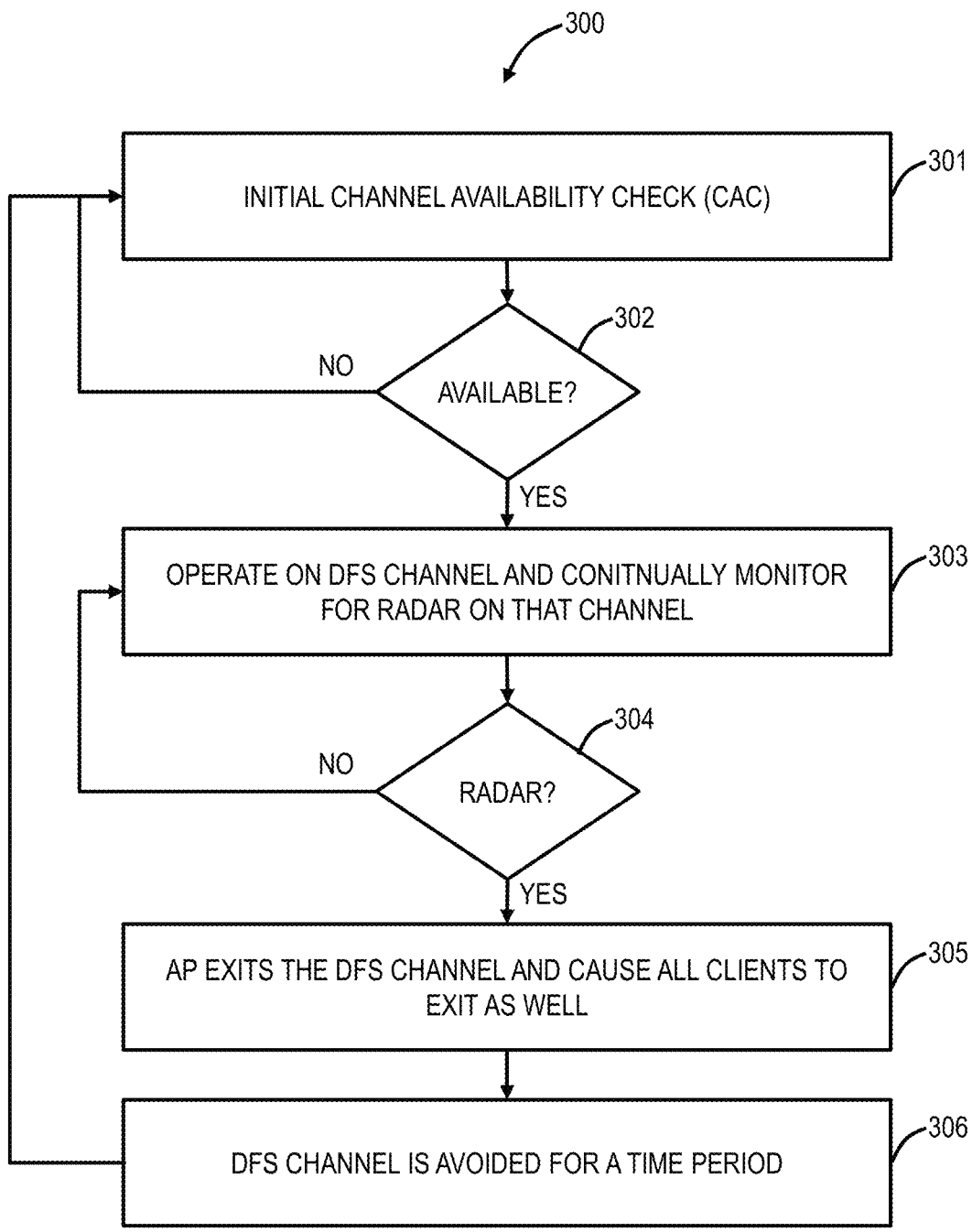
FIG. 5 is a flowchart of a radar detection process implemented with Wi-Fi networks.

Operation in the Dynamic Frequency Selection (DFS) bands requires radar detection. FIG. 5 is a flowchart of a radar detection process 300 implemented with Wi-Fi networks. The radar detection process 300 includes an initial Channel Availability Check (CAC) (step 301). This is a requirement to only listen for radar while making no transmissions of any kind (including beacons) for one minute before using a DFS channel. In the U.S., all channels have a one-minute requirement. In European Union (EU), the band 5590 to 5650 MHz, also known as 20 MHz channels 120, 124, and 128, requires a 10-minute CAC. In the U.S., utilizing the DFS bands increases the number of available 80 MHz channels from two to six. In the EU, utilizing the one-minute CAC channels increases the available channels from one to three. Adding the 10-minute CAC channel brings the total available in the EU to four. The ability to correctly find radar during the CAC period is determined by a chipset associated with the access point 14, 34 mesh node 36, repeater 38, etc. (collectively a "device" implementing the radar detection process 300).

After the CAC (step 301), if the DFS channel is available (no radar detected (step 302), the device can operate on the DFS channel while continually monitoring for radar on that channel (step 303). While in operation, a device must continue to look for radar on the channel on which it is operating. All chipsets support this while transmitting and receiving normal data traffic. A secondary aspect of successfully finding radar is not false triggering a radar alarm on noise or normal Wi-Fi traffic when no radar is present. In fact, radar systems in the 5 GHz band are relatively rare. The great majority of radar events are actually false alarms. This false alarm rate is what drives the need for quickly reacting DFS recovery mechanisms.

If radar is detected (correctly or falsely) (step 304), the device must exit the channel, and get all of the clients associated with it to exit the channel as well (step 305). This is done utilizing a Channel Switch Announcement (CSA). The CSA specifies a channel to move to, as well as a countdown of the number of beacons before all devices should simultaneously move to the new channel, in order to minimize disruption to the network. In the EU, the devices are allowed about 1 second to stop transmitting and 10 seconds to actually move off the channel. In the U.S., the allowed time is shorter: up to 200 ms to continue stop transmitting then another 60 ms of allowed transmissions over the next 10 seconds at which point devices must be off the channel. Note, for an organized channel change in the distributed Wi-Fi system 10, the CSA must be propagated down the tree from the detecting node to its ultimate leaf nodes, potentially down multiple tiers in the distributed Wi-Fi system 10. At each tier in the distributed Wi-Fi system 10, such message can pick up a delay of one beacon time, such as set to 200 ms for backhaul link beacons, and 100 ms for the client link beacons. The chipset in the device (e.g., hardware, software, and/or firmware) performs the in-service detection of radar events and sends the CSA.

If radar is detected on a channel, that channel may not be used for 30 minutes (step 306). When returning to the channel after the 30 minutes, a new channel availability check must be performed (step 301). For this reason, radar detection events should be reported to the cloud 12 with a time stamp, and the cloud 12 can keep track of the timing so as not to request re-use of the channel in question before the 30 minutes is up.

Pre-CAC: in the EU, it is allowed to perform a CAC ahead of time. In fact, once a CAC is performed on a channel it is considered valid indefinitely. That channel may be moved onto immediately, without doing a CAC at any time in the future. However, if radar is found present after moving to the channel, then the channel needs to be vacated, and it cannot be occupied again until a new CAC is completed. Pre-CAC is not officially allowed in the U.S.

Off-channel CAC: in the EU, it is allowed to perform a CAC a little bit at a time, jumping off of the current operating channel and taking measurements on the DFS channel periodically. There are very few specifics about this in the EU rules. The period of time that off-channel CAC is done must be at least 6 minutes, and not longer than 4 hours. During whatever time is chosen, the device must be able to detect radar with the reliability and range of parameters specified for regular CAC. As with Pre-CAC, the FCC has not approved off-channel CAC in the U.S.

Remote sensing: in the EU, one device can do CAC and communicate that to all other devices. Similarly, one device can do in-service monitoring and communicate that to all other devices.

As described herein, there are various standards, rules, guidelines, etc. related to usage of DFS frequency channels. The term "predetermined DFS rules" is meant to include a set of the standards, rules, guidelines, etc. That is, the present disclosure includes various aspects where a controller (e.g., a cloud controller, a controller embedded in an access point, a controller locally connected to an access point, etc.) is configured to control usage of DFS frequency channels pursuant to predetermined DFS rules. The following table compares parameters of interest for the U.S., EU, and Japan, including some of the predetermined DFS rules such as non-occupancy, CAC, etc.:

| Parameter | U.S. | EU | Japan |
| --- | --- | --- | --- |
| Non-occupancy | 30 minutes | 30 Minutes | 30 minutes |
| Channel availability check | 60 seconds (all channels) | 60 seconds, except 10 minutes 5570-5650 MHz (channel 124) | 60 seconds |
| Channel move (shut down) | 10 seconds | 10 seconds | 10 seconds |
| Channel closing transmission time | <= 200 ms initial, plus 60 ms over remaining 10 s period | 1 second | <= 260 ms total |
| Duty cycle CAC | No | Yes | No (according to Sporton) |
| Pre-CAC | No | Yes | Rumored, but Sporton says no |
| Remote sensor (one AP measures for all) | No | Yes | No (according to Sporton) |
| TPC | Without TPC: 5250-5350: 21 dBm + 6 dBi 5470-5725: 21 dBm + 6 dBi (giving up 3 dB EIRP in both cases, 30 dBm + 6 dBi in 5150-5250 and 5725-5850, no TPC allowed. Power levels without TPC are higher than our devices can produce) | Without TPC: 20 dBm EIRP 5250-5350, 27 dBm 5470-5725 (giving up 3 dB EIRP in both cases, 23 dBm EIRP in 5150-5250 no TPC allowed. Not having TPC will cost us about 3 dBm in 5250-5350) | 17 dBm all bands, (Not clear how TPC affects this, TPC is required. We are limited by other factors on v1, so TPC is not helpful.) |

Collaborative DFS

Current FCC rules do not allow one access point 14a to make DFS measurements for another access point 14b, unless all clients 16 that attach to that second access point 14b would hear and respect a CSA from the first access point 14a. This has to be addressed in the distributed Wi-Fi system 10. The first access point 14a, if it detects radar, could send the CSA both with its own BSSID (so as to inform its own clients) and again for each of the child access points 14b, that are leveraging the DFS detection of the first access point 14a, with a spoofed BSSID matching each of the child access points 14b. It is also expected this rule could be modified to allow the CSA to propagate down the chain rather than requiring the clients 16 to hear it directly.

A collaborative DFS approach would be advantageous especially in the context of the distributed Wi-Fi system 10. Potentially access points 14 could "vote" whether they have seen radar or not, greatly reducing the frequency of false alarms. Potentially one access point 14 could perform the CAC, taking only one access point 14 out of commission for only one CAC period. Given that result of the DFS lead access point 14, all access points 14 could then operate in that channel.

Potentially a single access point 14 in the home in the distributed Wi-Fi system 10 could be dedicated to doing the CAC on all channels for all the other access points 14. This access point 14 could be set up not to accept clients 16, thereby minimizing the amount of client roaming required to perform a CAC.

On initial startup, or when moving to DFS channel that has not been used before, at least one device would still need to do the CAC and the delay is still incurred. In the distributed Wi-Fi system 10, there can be two options to mitigate the disruption in the network in the case CAC needs to be performed at each of the access points 14 that will be operating on the new channel. First, the distributed Wi-Fi system 10 can be temporarily configured to use 2.4 GHz only during the time of the CAC, preserving the topology at the expense of channel diversity and channel bandwidth. For example, all the CACs can be scheduled jointly so the distributed Wi-Fi system 10 is disrupted just for the one minute (short period, large disruption). Second, the distributed Wi-Fi system 10 can take access points 14 out of commission one at a time, to perform the CAC sequentially (long period, but mild disruption). Client devices 16 would need to roam twice or so during this time.

The distributed Wi-Fi system 10 can use off-channel CAC techniques in conjunction with off-channel scanning, to make the CAC transparent, to build a list of Pre-CACed channels. In some embodiments, the distributed Wi-Fi system 10 can include three or more radios in the access points 14. Here, nearly every access point 14 in the distributed Wi-Fi system 10 can be on a different channel, such that no node could leverage the DFS information from another device. In this case, a collaborative DFS system has less benefit, although there still might be occasions when leveraging the DFS check might be beneficial.

The distributed Wi-Fi system 10 with the cloud 12 for control has the potential to provide a differentiated DFS algorithm. For example, the distributed Wi-Fi system 10 with 6+ nodes in the home can easily be used to have one access point 14 taken out of service to make measurements. This is enabled by the distributed Wi-Fi system 10 and difficult or impossible with the access point system 30, the Wi-Fi mesh network 32, or the Wi-Fi repeater network 33. The distributed Wi-Fi system 10 has a high degree of centralized control, being able to choose and time when access points 14 perform measurements and is further able to steer clients 16 between bands or access points 14.

DFS Process in a Distributed Wi-Fi System

Figure 6:
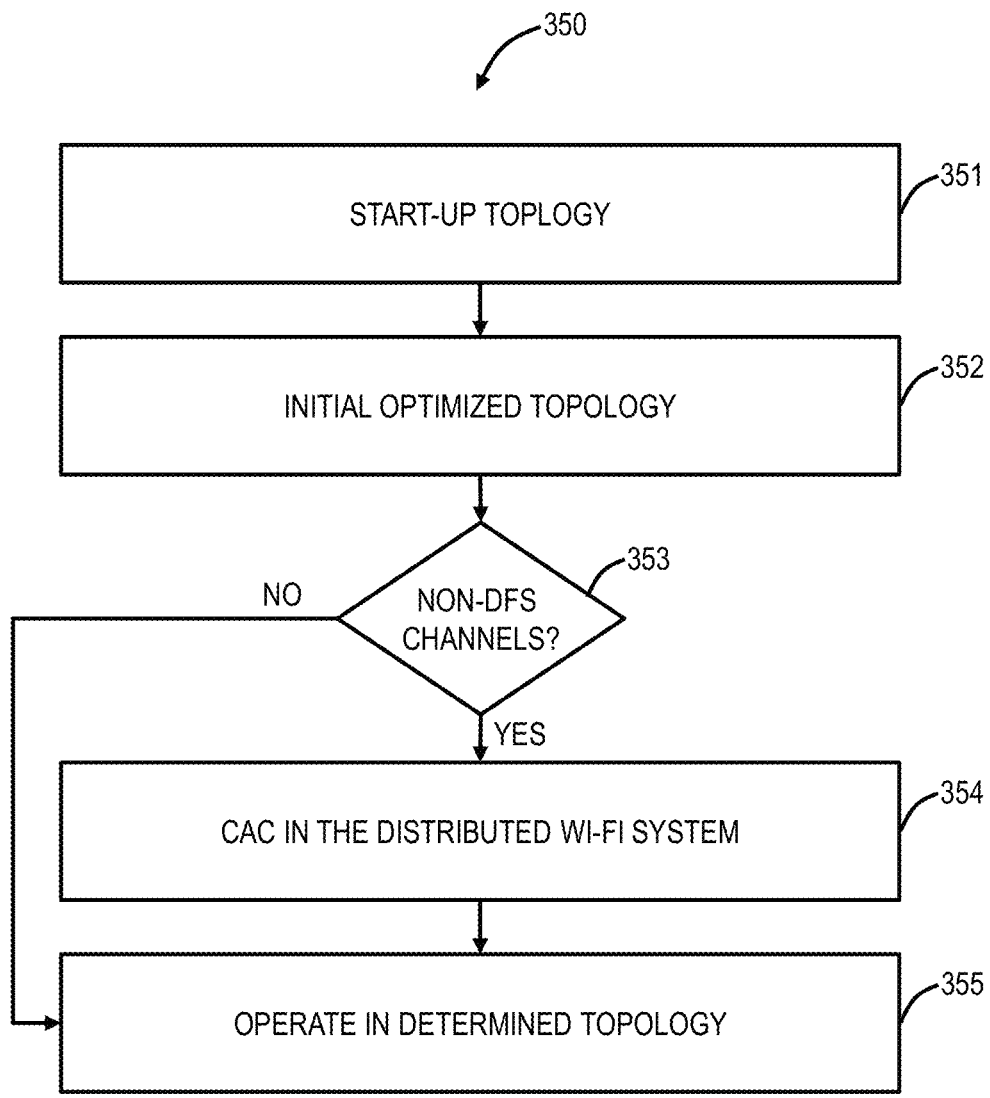
FIG. 6 is a flowchart of a DFS process in the distributed Wi-Fi system of FIG. 1.

FIG. 6 is a flowchart of a DFS process 350 in the distributed Wi-Fi system 10. At network start-up, all nodes in the distributed Wi-Fi system 10 are on the same non-DFS frequency channel or different non-DFS channels for a start-up topology (both client and backhaul wireless links) (step 351). The network can start up with all nodes on the same non-DFS frequency channel (e.g. channel 40). Alternatively, if there are multiple non-DFS channels, the gateway access point 14a device can choose among the non-DFS channels by looking at the interference level on each and selecting the channel with the lowest interference. All other access points 14 could find/follow the gateway access point 14a. However, starting all nodes on channel 40, which is probably sufficient given this topology is used only briefly.

Measurements are made and sent to the cloud by the access points 14 in the distributed Wi-Fi system 10. Based on these, the cloud 12 does an initial optimization of the topology (step 352). If the interference or network topology is such that it is desirable to move all or a portion of the distributed Wi-Fi system 10 off of the non-DFS channels (step 353), a DFS CAC is performed by the devices to be moved at that time (step 354). The cloud 12 controls the movement of the appropriate devices 16 to the DFS channels, but performing the CAC is done automatically as required by the individual access points 14. Details of the CAC in the distributed Wi-Fi system 10 are provided as follows for different approaches—simultaneous, sequential, etc. After the initial optimization, with or without DFS channels, the distributed Wi-Fi system 10 operates in the determined topology (step 355).

In an embodiment, the 10-minute CAC channels can be avoided at this stage, so these channels would not be made available to the optimizer for the initial optimized topology. In another embodiment, the initial optimized topology can be confined to only non-DFS channels, but is otherwise optimal given that constraint. After the distributed Wi-Fi system 10 is up and running in the non-DFS optimized topology, the process 350 can proceed to the steps of changing DFS channels as outlined below in order to move into a fully optimized topology that makes use of DFS channels. This two-step approach gives the advantage that the distributed Wi-Fi system 10 will operate better sooner, but will take longer to get into a more fully optimized arrangement. The desirability of this approach will also depend on how well the various techniques to change DFS channels work as described below.

There are many ways that a change into a topology that utilizes DFS channels could be performed in the distributed Wi-Fi system 10. The main challenge of such change is the requirement to do the CAC before operating on the new DFS channel. Two of the main decisions to be made are whether to perform all the CACs simultaneously, or one at a time, and whether to create a temporary topology to support the network while the channel changes are being made. Combining these factors there are four options. Note, all options listed below could be selectively employed only when the network is idle, for example, late at night.

Simultaneous CAC, No Temporary Topology

In this option, the devices are commanded by the cloud 12 to move to their new channels simultaneously. They each move to the new channel and perform the CAC. When they have completed their CAC, they come up on the assigned channel, and all devices should be able to find each other. Timeouts are extended during this transition to ensure sufficient time for all nodes to complete the CAC, begin beaconing, and find their respective connections. A recovery mechanism is required in case one of the devices fails its CAC (discussed herein). This approach has the advantage of simplicity and a minimum time to reach the final state. However, this approach has the disadvantage of being highly disruptive, as the entire network potentially could be off-line for the full minute; has a high degree of chaos to fix if one of the devices fails its CAC; and does not leverage the cloud 12 controlled distributed system capabilities.

Simultaneous CAC, Temporary Topology

As in the previous case, all nodes moving to new channels are commanded to move and perform their CACs simultaneously. However, before moving, a temporary topology will be put in place to keep the distributed Wi-Fi system 10 running as best it can while the CACs are in progress. Since the 5 GHz radios are unavailable during the time of the CAC, this will require forming a topology among those devices that uses only the 2.4 GHz channels. This topology might be constrained to match the desired final topology or it could be a completely independent topology.

Figure 7:
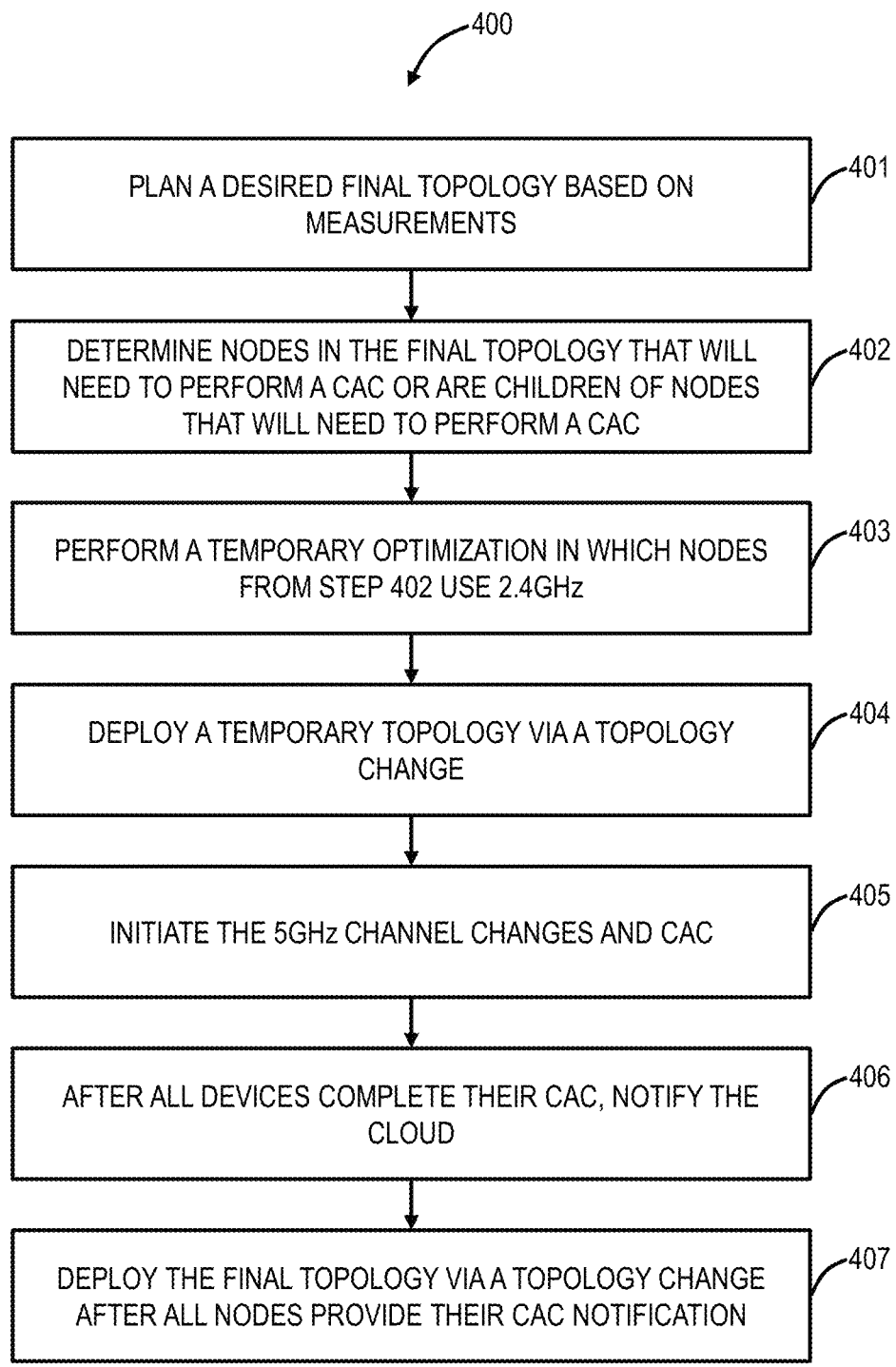
FIG. 7 is a flowchart of a process for simultaneous CAC with a temporary topology in the distributed Wi-Fi system of FIG. 1.

FIG. 7 is a flowchart of a process 400 for simultaneous CAC with a temporary topology in the distributed Wi-Fi system 10. The process 400 includes planning a desired final topology based on measurements (step 401) and identifying the nodes in the final topology that will need to perform a CAC, or are the children of clients performing a CAC (step 402). These nodes are ones that will need a DFS channel in the final topology and require the CAC prior to channel occupancy. The process 400 includes performing a temporary optimization, in which the nodes identified in step 402 are connected via a 2.4 GHz link (non-DFS channel) (step 403).

The process 400 includes deploying the temporary topology via a topology change (step 404). After the temporary topology, the process 400 includes initiating the 5 GHz channel changes and CAC (step 405). When all devices have successfully completed their CAC, they notify the cloud 12 that they are ready for the final topology (step 406). When all nodes requiring a CAC have notified of their successful CAC, the final topology is deployed via a topology change (step 407). A recovery mechanism would be required in case one of the devices fails its CAC (discussed herein).

The advantages of this approach include maintaining network connectivity throughout the deployment of the topology that utilizes DFS, all nodes stay in communication throughout the CAC period and a positive confirmation of success (or failure) can be received, and failure recovery may be more organized as the devices are connected in a workable topology. The disadvantages of this approach include two optimizations and two topology changes to achieve a new DFS utilizing topology and network performance can be significantly degraded during topology change due to use of all 2.4 GHz links.

The temporary topology could be formed not through planning and a pre-meditated topology change, but rather by natural node recovery during the CAC. If the 5 GHz radio is locked up for a minute, and the node realizes it is no longer connected, a connection on the 2 GHz radio will presumably be found to form a complete network. The advantage is that only one optimization and channel change would then be required. The disadvantage is a longer network disruption, and perhaps less reliable communication of the completion of the CAC, leading to a less reliable overall final topology deployment.

Sequential CAC, No Temporary Topology

Strictly speaking this option may not be viable. If the CACs are performed sequentially, the total topology change will take several to many minutes of time. If there is no workable topology during that entire time period, the network will be extremely disrupted, and there will be a long period with no ability to control and monitor the change.

Sequential CAC, Temporary Topology

The concept here is to identify the nodes that need to perform a CAC, move them one time to the new channel. Before (or during) each node movement, the node, and its child trees would be connected either via a planned topology, or through the natural recovery mechanisms of the devices.

Figure 8:
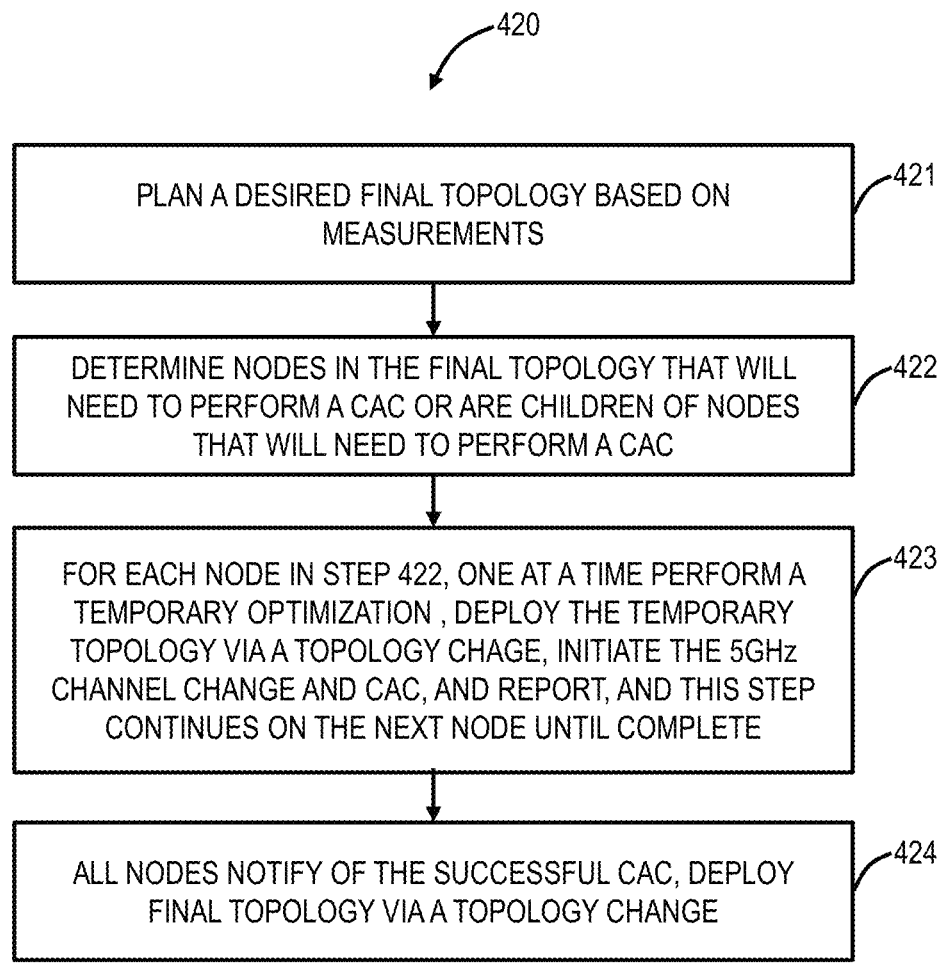
FIG. 8 is a flowchart of a process for sequential CAC with a temporary topology in the distributed Wi-Fi system of FIG. 1.

FIG. 8 is a flowchart of a process 420 for sequential CAC with a temporary topology in the distributed Wi-Fi system 10. The process 420 includes planning a desired final topology based on measurements (step 421) and identifying the nodes in the final topology that will need to perform a CAC, or are the children of clients performing a CAC (step 422). These nodes are ones that will need a DFS channel in the final topology and require the CAC prior to channel occupancy.

For each of those nodes in step 422, the process 420 performs, one at a time (step 423): performs a temporary optimization, in which the node is connected via a 2.4 GHz link, and all other nodes are assigned as they are best connected given the unavailability of the 5 GHz radio in the node performing the CAC; deploys the temporary topology via a topology change; initiates the 5G channel change and CAC for the one node being moved; and, when the CAC is reported as successful, loop to step 423 and begin on the next node to be moved to a DFS channel. When all nodes requiring a CAC have notified of their successful CAC, deploy the final topology via a topology change (step 424).

The process 420 has the advantage of, at any moment only, one node in the network is in a non-optimized state—mild degradation to performance at all times, roughly corresponding to the performance of a network with one fewer access point 14. Also, if there is a failure along the way, the network is left in a nearly optimized state. However, the process 420 requires a large number of optimizations and topology changes and depending on intermediate topology choices, client devices could be required to roam multiple times between bands and access points 14.

The temporary topology at each state could be formed just by the natural recovery of the node doing the CAC. That node would find someplace to connect on the 2.4 GHz band. The temporary topology could be a single topology planned up front. Essentially this would be the same 2.4 GHz only topology as would be deployed for the simultaneous channel change case. However, the nodes could still do their CAC sequentially.

The temporary topologies at each step could simply be the 2.4 GHz version of the desired final link. In other words, if in the final topology node E is going to be attached to some node C on a 5 GHz DFS channel, node E would first attach to node C on 2.4 GHz, then perform its CAC, then node C would perform its CAC on 5 GHz, then that one specific link would be moved to the new 5G channel, and so forth. It would seem this approach could be deployed from the leaves up, or the trunk down. Since channel changes can be performed from the trunk down, it might be natural to take that approach.

The sequence can include based on measurements, plan a desired final topology; plan a sequence of parent changes and channel changes starting by moving nodes from the top of the tree; move the node highest up in the tree to its desired parent/channel arrangement, using a CSA as necessary to get its clients to follow it. However, if it is moving to a DFS channel, the channel change and CSA proceed in steps as follows: send a CSA to the children (and on to their children) as appropriate to move that complete branch of the tree to the 2.4 GHz backhaul channel, command all devices down the tree that will end up on the new DFS channel to perform a CAC on that channel, and when the CAC is complete, change the tree to the new DFS channel.

Pioneer and Star

A particular aspect of the topology arrangements in the distributed Wi-Fi system 10 opens another option. The child interface of the access point 14 (the interface that connects to the parent) is actually a client type interface, and for DFS purposes is a slave to the parent's DFS master. This child interface is free to connect and operate on any frequency channel on which there are beacons, even if those beacons are on a DFS channel.

It is possible then for the following sequence of actions to be legitimate:

move one access point 14 to a 5 GHz DFS channel and perform the CAC; move the remaining access points 14 that want to be on the DFS channel to be children of the first access point 14 that was moved; have those access points 14 perform their CAC in parallel (simultaneously). During the time that they are performing their CAC, they are connected into the network as leaf nodes to the original access point 14 that was moved. They will allow clients to connect in the 2.4 GHz band, but as they cannot beacon on the 5 GHz band, will not allow children or clients on the 5 GHz band. However, they can forward their client traffic up the tree on the new 5 GHz DFS channel immediately. When the second group of access points 14 CAC is done, the entire desired topology can be deployed.

Recovery from Failed CAC

Depending on the frequency of failure, a simpler or more complicated fallback mechanism can be used, such as:

Repeat the optimization with the failed channel marked as dead for 30 minutes for that AP. Get the new optimization and re-optimize the network.

There is also the option to return to the last known good network state, perhaps while the new optimization is being fetched. This has uncertain regulatory status if the same or a different DFS channel was being used in the original topology.

Fall back to a "backup" optimization that has only non-DFS channels.

Let the node that has failed CAC, and any children go through recovery.

Deploy an "approximate" desired topology in which the topology is the same, but channel 40 is used for all the 5 GHz links. Queue the network for re-optimization, marking the failed DFS channel as unusable.

Reaction to Radar Event

If radar events are very rare, a simple recovery mechanism in which the access point 14 that detected the radar disconnects from the DFS channel and goes into recovery would be sufficient. That access point 14 can connect to the network on a 2.4 GHz channel, or a different 5 GHz channel. Any children it had can similarly go through recovery, recognizing that if they attach on a DFS channel that they were not operating on, they can connect as children right away, but need to do a CAC before beginning to beacon.

Another option for a parent that detects radar is to send a CSA for a 2.4 GHz channel down the tree to its children. This creates a safe and smooth transition, but one which is not very optimal.

Another option would be to ensure that every home had at least a portion of the network on the non-DFS channel (channel 40) at all times. This could perhaps be the gateway access point 14a. Note that there are additional reasons to ensure at least one access point 14 is on channel 40 at all times. It is reported that there are some clients 16 that will not connect on a DFS channel at all, even if an access point 14 is beaconing on a DFS channel. Having some place for those clients to attach within the home is important.

An access point 14 that is on a DFS channel, and detects a radar event should move immediately to a non-DFS channel, sending its children a CSA, in anticipation that there will be something for it to connect to when it gets there. As before, the network could then be queued for re-optimization with the constraint that the access point 14 in question cannot use the DFS channel.

There is also the potential to use a more coordinated CSA to move the network en masse to a safe channel after a DFS event. An access point 14 that detects a radar event would signal its parent of the issue, which in turn would signal its parent, until it reaches a point in the tree where the DFS channel is no longer used. At that point, the access point 14 closest to the root in the tree that is using the DFS channel would issue the CSA down the tree to move the entire tree to the non-DFS channel. This is not strictly necessary, as only the device that detects the DFS event, and its children which are affected by that, need to make a channel change. The parents above do not need to make such a change. However, the network will be left in a near optimized state if the entire portion of the tree moves from top to bottom to a new 5 GHz channel.

Special Considerations for the Gateway Access Point

The gateway access point 14a does not have any parents, so in some ways it is the most convenient to move. Having decided to move, it can simply bring the rest of the network with it through the CSA process. However, it is also the node that will be most disruptive to have do an off-channel CAC. It does not need to be entirely disruptive if the rest of the network is configured to attach on 2.4 GHz before the gateway goes off to do its CAC.

Another advantage of keeping the gateway access point 14a on a non-DFS channel is that it makes a nice place for devices that are in recovery, to attach, since children of those devices can reform themselves quickly around access points 14 that are operating on a non-DFS channel.

Current Industry DFS Mechanisms

The most disruptive aspect of DFS radar detection is the Channel Availability Check (CAC). The CAC is a requirement to sense for radar signals before operating in a DFS channel (channel requiring radar detection). This check is required to be done continuously for one minute. In the EU, there is a set of frequencies, 5590 to 5650 MHz in Europe, also known as 20 MHz channels 120, 124, and 128, that require a 10-minute CAC. Currently three basic approaches to the Channel Availability Check are being used in the industry: start-up CAC, off-channel CAC, continuous CAC.

Start-Up CAC

The simplest approach does the CAC continuously using the one and only 5 GHz radio in the device. This minimizes the cost of the device, but causes an interruption of 1 minute in the 5 GHz network activity in order to change to a DFS channel. Usually such check is done when the access point 14 is first powered up, at which time the user may tolerate such a delay. Most of these systems avoid using any portion of the channels from 5590 to 5650 MHz in the EU, also known as 20 MHz channels 120, 124, and 128, as these channels require a 10-minute CAC, which would be prohibitive even during network initialization. While this approach is simple and saves hardware, it makes changing channels very disruptive, and therefore undesirable.

Three situations could necessitate changing channels: detection of an actual radar (rare), a radar false alarm (more common, depending on the underlying chipset), and the need to change channel due to a high level of interference. In the simplest approach, the tradition is for an access point 14 which is operating on a DFS channel but needs to vacate that channel for any of the above reasons, to move to a non-DFS channel, thereby avoiding having to disrupt the network with the 1-minute CAC at that moment. The access point 14 may usually be left to operate on the non-DFS channel until it is rebooted, or perhaps is moved back to a DFS channel after a one-minute CAC during a low activity period, such as in the middle of the night. The disadvantage with this approach is that over time, many access points 14 end up back on the few non-DFS channels increasing congestion on those channels.

Off-Channel CAC

A second approach is to do what is called off-channel CAC. In this approach, the operating access point 14 jumps off channel and briefly listens for radars to determine an alternative DFS channel that the access point 14 could move to if desired. This has the advantage of not requiring any extra hardware in the device. It has the disadvantage of disrupting traffic flow within the network, even if briefly, while the off-channel measurements are being made. This is not trivial, as the off-channel CAC must be done over a period of at least one hour according to the EU rules. Other disadvantages include that the method has not been officially approved for use in the U.S., and that the device must still be able to actually find the radars reliably when utilizing the off-channel CAC method, which can be challenging when the listening duty cycle is low, as would be required to keep on-channel network operation strong. The off-channel CAC method is also not supported on many chipsets, limiting chipset selection for the product.

Continuous CAC

A third approach used in the industry is to equip the access point 14 with a dedicated resource for performing the CAC. Typically, a second 5 GHz radio is added which can search for radar signals on a 5 GHz channel that the main access point 14 is not utilizing for radar detection. In some of the newest chipsets, this resource can be used to increase the MIMO dimension of the main 5 GHz system when the auxiliary radio is not being used to do radar detection. While this approach makes radar detection relatively straightforward, it increases the cost of the solution, and it decreases the performance of the system while a CAC is being performed on a different channel.

Distributed CAC

Because of the nature of the distributed Wi-Fi system 10, a distributed approach to CAC can be used. The fundamental approach is that when it is desired to move any portion of the network onto a DFS channel, only a subset of the devices are in motion making CAC measurements at a time. The remainder of the devices are up and operating normally, providing good performance to the network. In addition, because the distributed Wi-Fi system 10 has many options for how devices connect, both in terms of topology and channels, it is always possible for all nodes to remain connected and usable while a transition to a DFS network is made.

Figure 9:
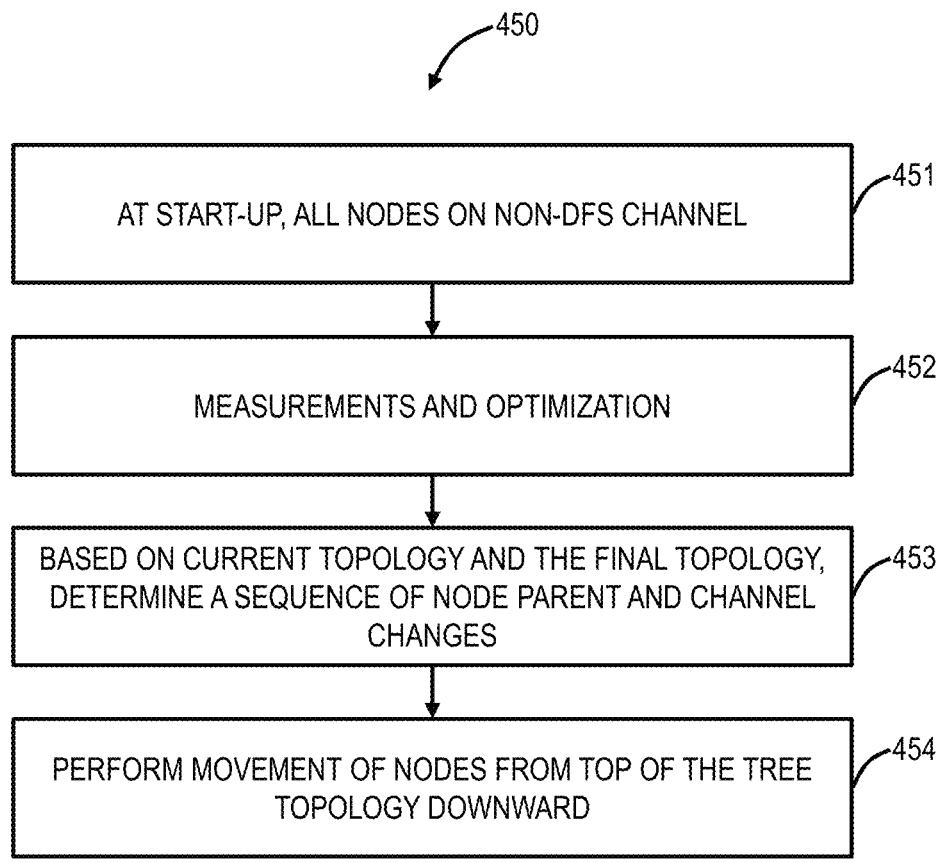
FIG. 9 is a flowchart of a distributed CAC process used in the distributed Wi-Fi system of FIG. 1.

FIG. 9 is a flowchart of a distributed CAC process 450 used in the distributed Wi-Fi system 10. When the distributed Wi-Fi system 10 is first started up, it comes up in a start-up topology in which all devices operate on the same non-DFS channel (step 451). This topology is used only temporarily while measurements are gathered. Once sufficient measurements are gathered and moved to the cloud, an initial optimization is performed (step 452). This optimization factors the signal strengths and data rates that can be maintained between access points 14, and factors the level of interference on different frequency channels as well. Based on these factors an optimum topology and set of frequency channels is chosen for the client and backhaul links. In many cases this topology will include DFS frequency channels that require radar detection and an initial CAC.

Once an optimum topology has been chosen that utilizes a DFS topology, the trick is to configure the distributed Wi-Fi system 10 into that topology while continuously providing the highest possible performance to clients 16 in the home. As mentioned earlier, an approach is to shift into the new topology one step at a time, using connections on non-DFS channels to maintain network connectivity throughout the process even as channel availability checks are being performed over an extended period. One of the aspects of the distributed Wi-Fi system 10 approach that makes this possible is the ability to use any mix 2.4 GHz or 5 GHz or 5 GHz channels in the backhaul. Thus, if a particular access point 14 in the distributed Wi-Fi system 10 is doing a CAC on a 5 GHz channel, that access point 14 can still be connected into the distributed Wi-Fi system 10, and clients 16 can attach to that access point 14 using the 2.4 GHz capability in that client.

Based on the current topology, and the desired final topology, a sequence of node parent and channel changes is planned (step 453). The sequence should start by moving nodes at the top of the tree and move downward (step 454). This order is preferable as when a node at the top of the tree is moved, a CSA is used to induce all of its children to move with it, allowing for a graceful transition during which all nodes always stay connected in the network.

The access point 14 highest up in the tree is moved to its desired parent/channel arrangement, using a CSA as necessary to get its clients to follow it. However, if it is moving to a DFS channel, the channel change and CSA proceed in two steps as follows: send a CSA to the children (and on to their children) as appropriate to move that complete branch of the tree to a 2.4 GHz backhaul channel, command all devices down the tree that will end up on the new DFS channel to perform a CAC on that DFS channel, and when all the devices in the tree have completed their CAC, change entire the tree to the new DFS channel.

The process 450 proceeds to any access points 14 lower in the tree that have not already been moved to their desired configuration.

The above sequence maintains connection of all access points 14 at all times. During the period that channel availability checks are being performed, the network is only degraded by those links operating in the 2.4 GHz band rather than the 5 GHz band. As soon as the CAC periods have completed, the links are switched back to the recently cleared 5 GHz channels restoring full performance to the network. In addition, the temporary degradation affects only the portions of the network needing to perform the CAC. Other branches of the network tree are not affected.

The process 450 is used for all topology changes that involve moving any portion of the network to a new 5 GHz DFS channel. This could be the initial topology change to install the initial optimization, or any subsequent topology change following re-optimizations that may have been triggered by interference or changes in channel gains and data rates.

Reacting to Radar Events

In the rare case of a radar event, the access point 14 which has detected the radar event must vacate the channel quickly. By default, the access point 14 will move to a non-DFS channel, so it can begin operation immediately following this emergency situation. As it is moving, it will inform its children of the impending change with a CSA. The children will pass this CSA on to their children and so forth. In that way the sub-tree connected to the access point 14 which had the radar event will remain intact. The access point 14 that had the radar event can attach into the rest of the network either on the non-DFS channel, if it is in use somewhere else in the network, or can connect to the rest of the network through a 2.4 GHz channel, which are available at all access points 14. Because the network is no longer in a optimum state, the cloud 12 is informed that a radar event has occurred and perturbed the network. The cloud 12 is made aware of the new topology, and the home is queued for a re-optimization.

Respecting the 30-Minute Non-Occupancy Period

The 30-minute non-occupancy period is doubly enforced. First, when a radar event happens, the cloud 12 is notified of the access point 14 and time at which the event occurred. The cloud 12 keeps a record of this. At any point when re-optimizing the network within the 30-minute period, the optimizer will add a constraint on the optimization, barring it from putting that access point 14 back on the channel which had the radar event.

In addition, the access points 14 themselves keep a record of the channel and time when the radar event occurred and will not move onto a channel that would violate the rule. This safety check ensures that even if the cloud state is out of synch for some reason, that the non-occupancy period will not be violated. After the 30-minute period has elapsed, the optimizer may once again choose that channel, perhaps because it has the lowest level of interference. In that case a new topology will be deployed, and channel availability checks will be performed as necessary, following the step by step process for topology change described above.

Example Operations

Figure 10:
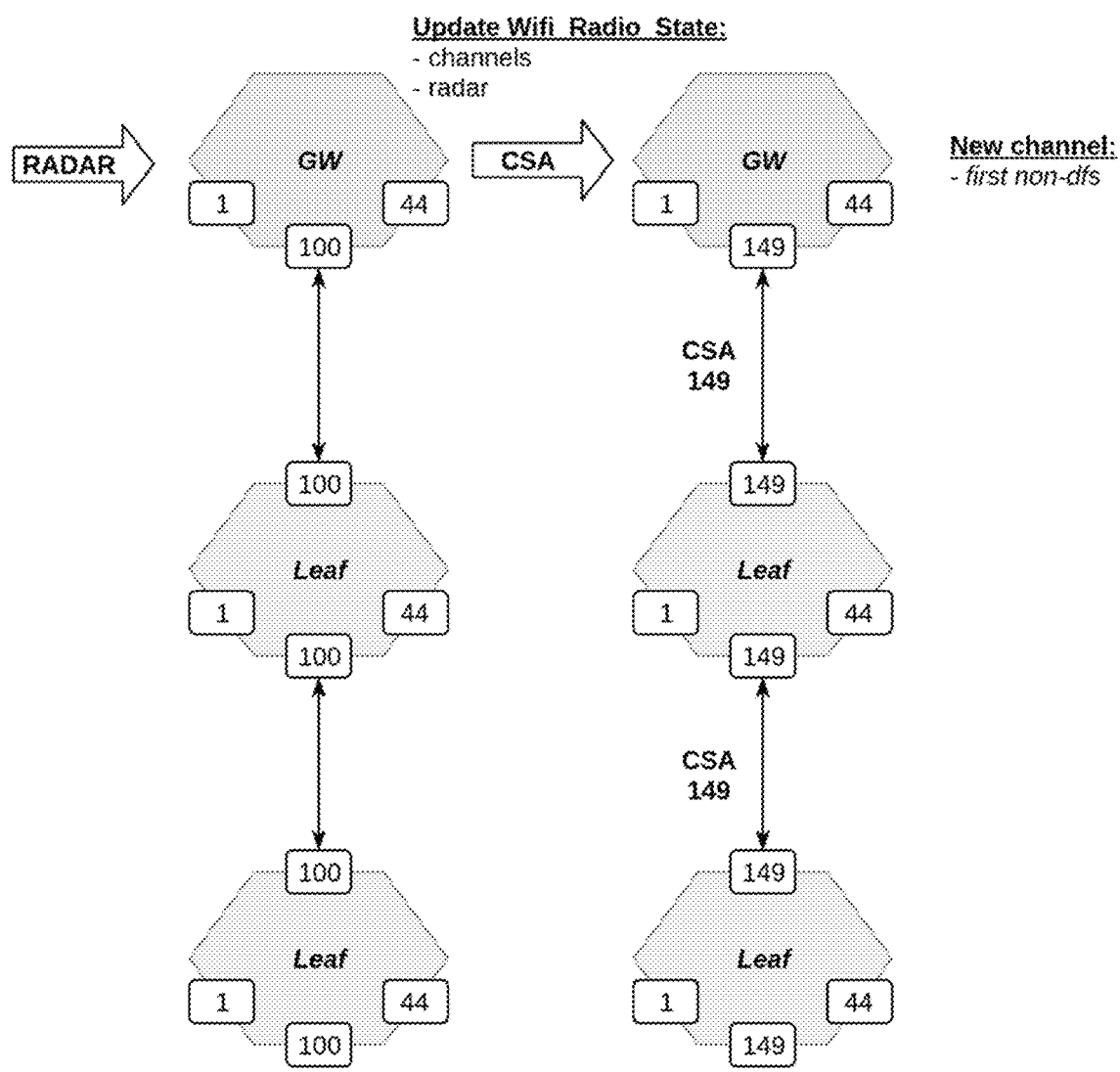
FIG. 10 is a network diagram illustrating radar detection at a gateway access point and associated CSA process.
Figure 11:
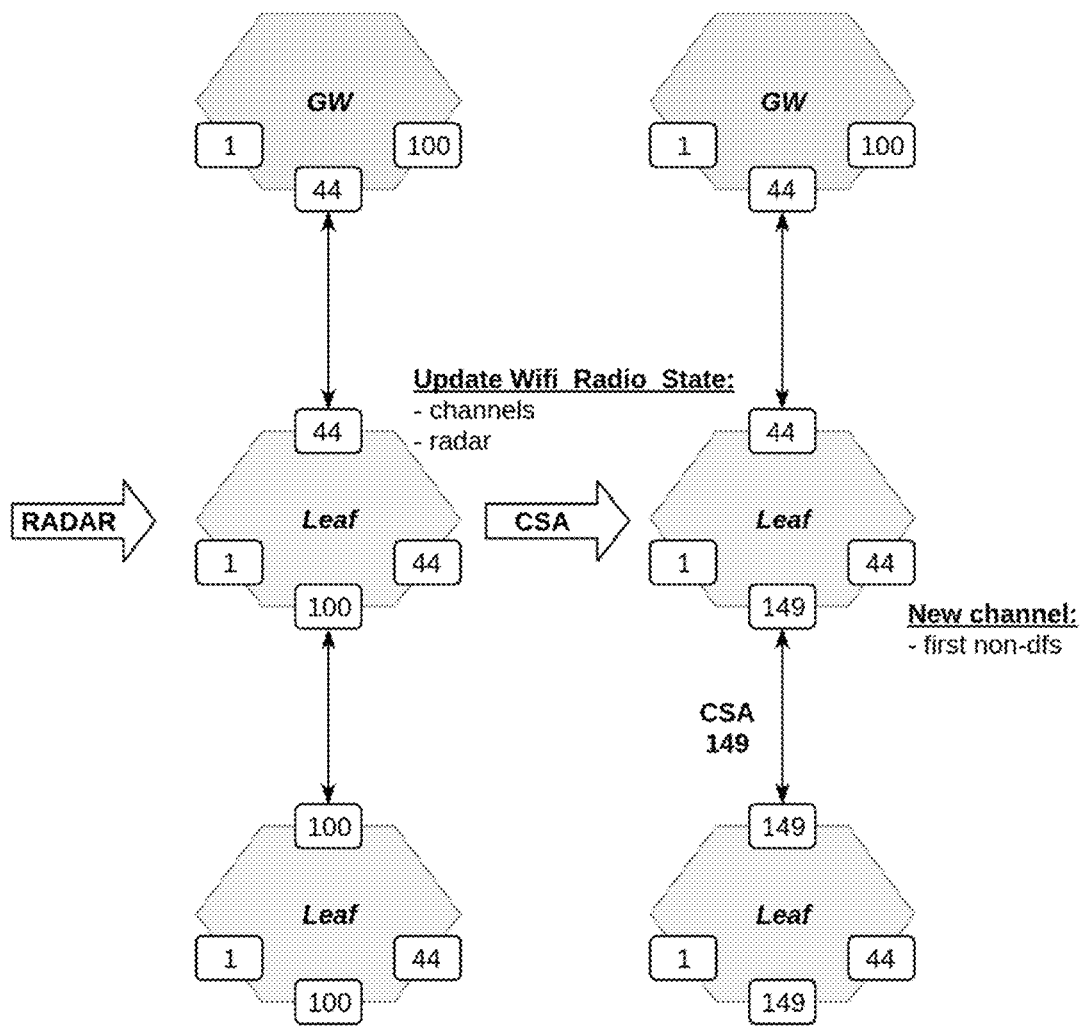
FIG. 11 is a network diagram illustrating radar detection at a leaf access point and associated CSA process.
Figure 12:
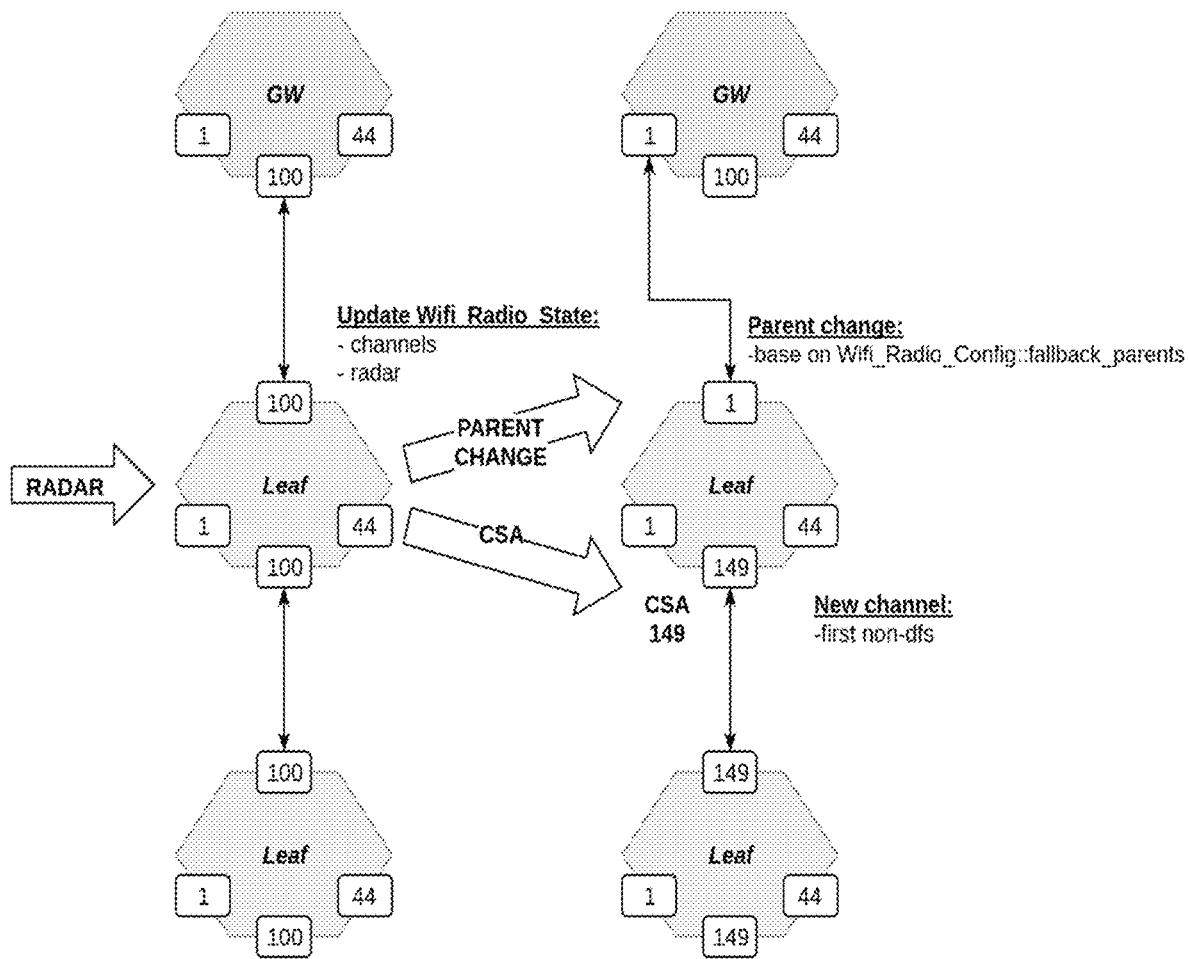
FIG. 12 is a network diagram illustrating radar detection at a leaf access point on both client and backhaul links and associated CSA process.
Figure 13:
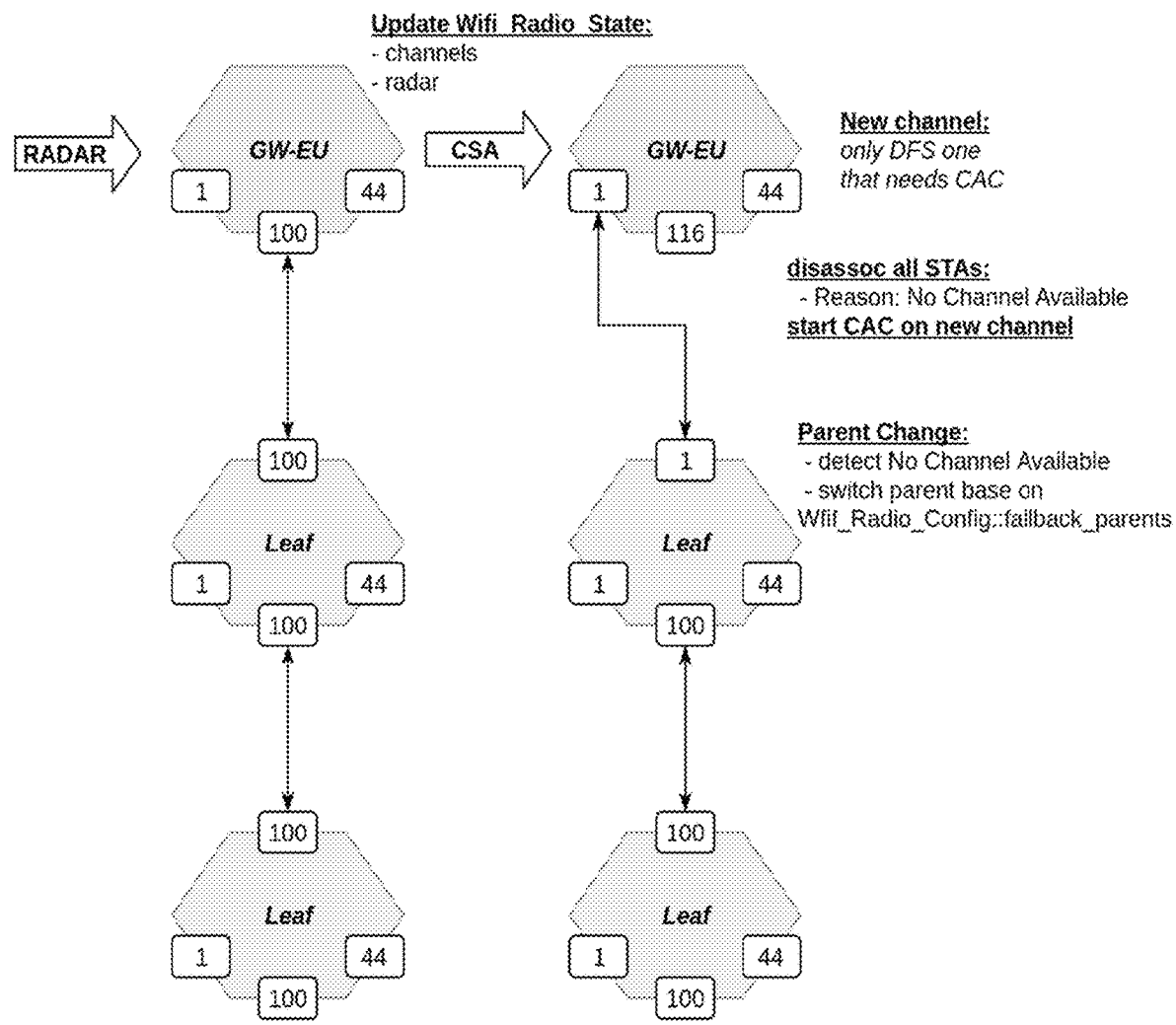
FIG. 13 is a network diagram illustrating radar detection at a gateway access point and associated fallback to a non-DFS channel.

FIG. 10 is a network diagram illustrating radar detection at a gateway access point and associated CSA process. FIG. 11 is a network diagram illustrating radar detection at a leaf access point and associated CSA process. FIG. 12 is a network diagram illustrating radar detection at a leaf access point on both client and backhaul links and associated CSA process. FIG. 13 is a network diagram illustrating radar detection at a gateway access point and associated fallback to a non-DFS channel.

Figure 14:
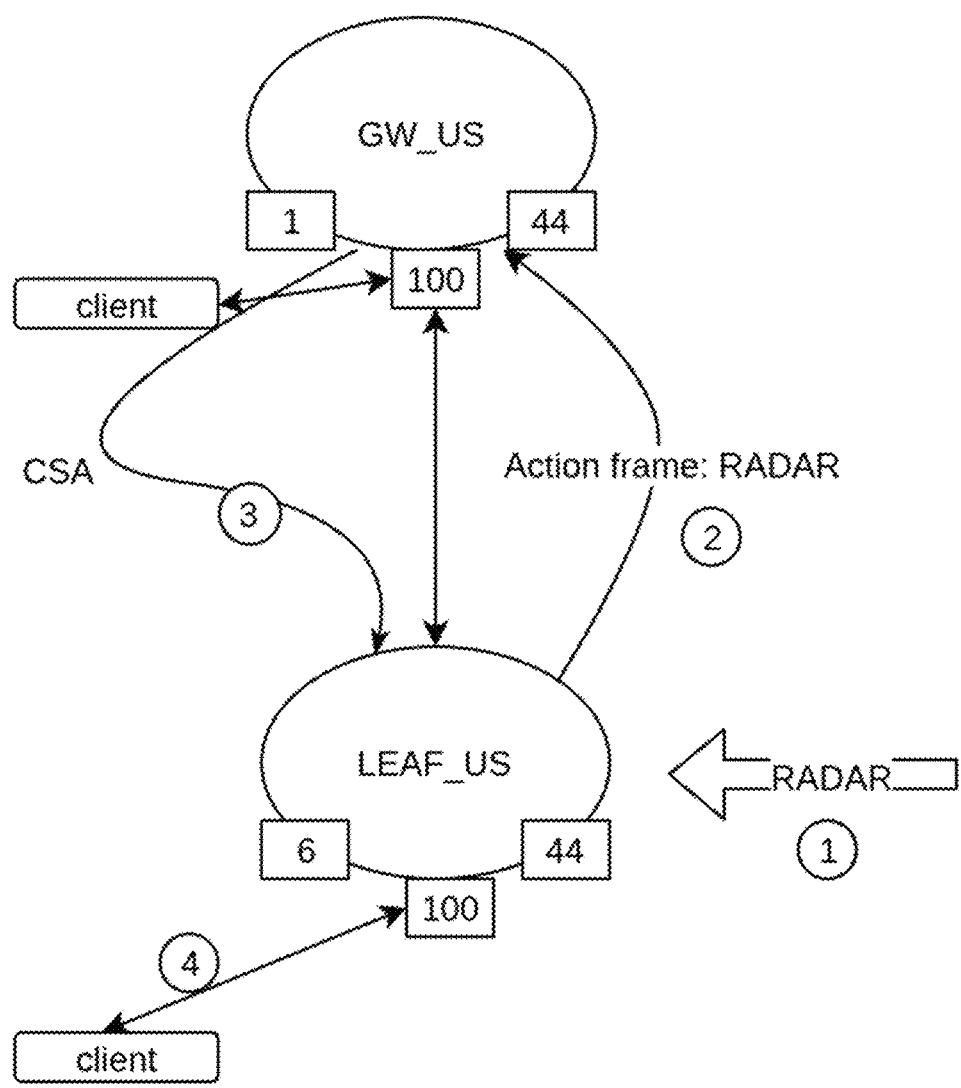
FIG. 14 is a flow diagram of radar detection in the U.S. on a backhaul channel.

FIG. 14 is a flow diagram of radar detection in the U.S. on a backhaul channel.

detected radar on Radio2 on channel 100 (1)
    check if bhaul-sta using also same DFS channel
        no, just check if next channel valid and request CSA
        yes, then send this Radar action frame to Parent (2)
    parent if bhaul-sta using also same DFS channel
        no, just check if next channel valid and request CSA (3)
        yes, then send this Radar action frame to Parent
    just request standard CSA to channel=149 (3)
    switch to 149 done (4)

Figure 15:
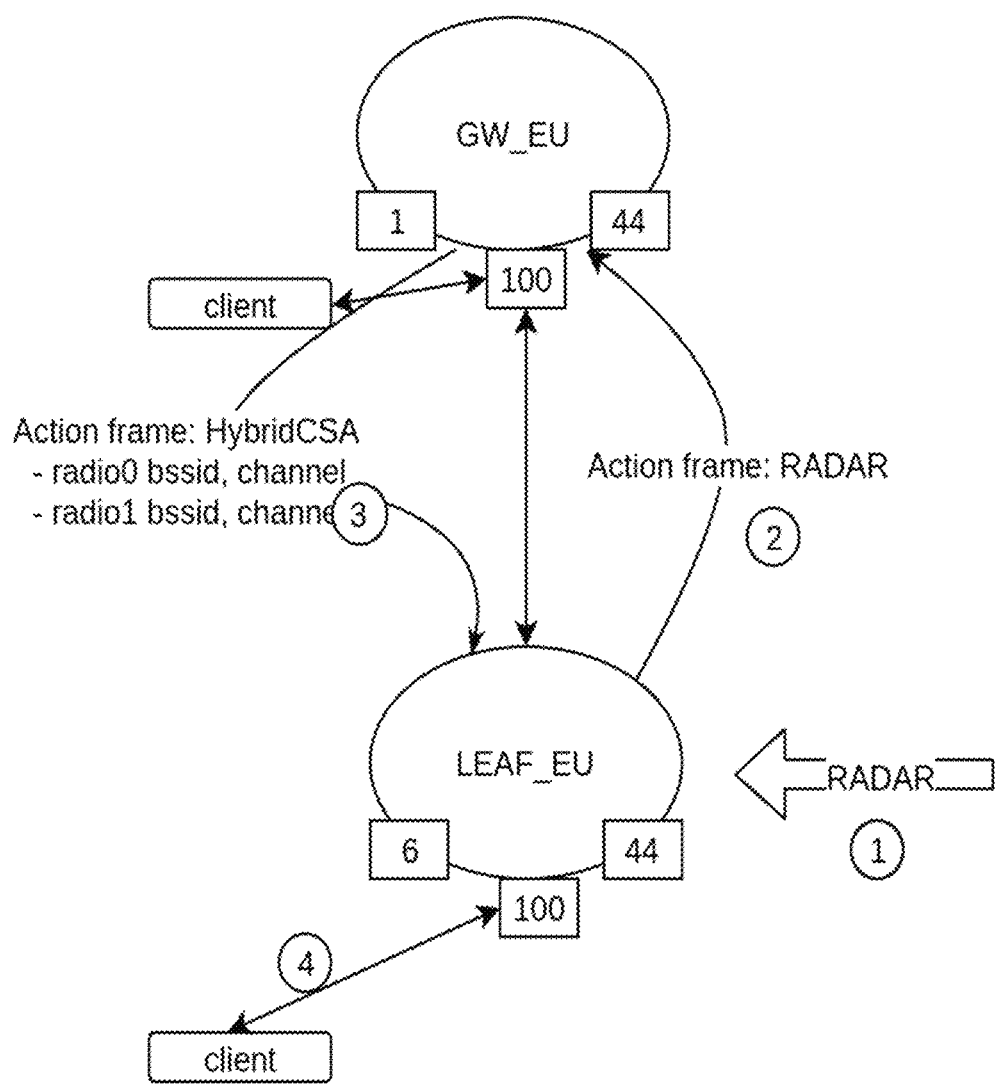
FIG. 15 is a flow diagram of radar detection in the EU. on a backhaul channel.

FIG. 15 is a flow diagram of radar detection in the EU on a backhaul channel.

Leaf AP detect RADAR:
    detected radar on Radio2 on channel 100 (1)
    check if bhau-sta using also same dfs channel
        yes, then send this Radar action frame to Parent (2)
    Parent AP receive action Radar frame from children:
    check if bhau-sta using also same dfs channel
        yes, then send this Radar action frame to Parent
        no, check if next channel valid
            yes, build standard CSA, send to child
            no, build HybridCSA action frame (add radio0/radio1 bssid and channel—non-dfs), send to child (3)
    Leaf AP receive HybridCSA:
    build own HybridCSA and send to bhaul-ap stations (own bssid) if present
    send HybridCSA to user mode (include wifiX, bssid, channel)
        from WM use parentchange.sh wifiX bssid channel DFS—First Approach In this approach, all optimizations, including the initial optimization, proceed with a few extra steps in the optimization process.

An optimization is triggered by an existing topology triggers (Scheduled, Topology Change, Stats Change, Interference, etc.) or by a new trigger "Radar detected."

The optimizer chooses a new topology. The optimization proceeds with an added constraint not to use anywhere in the network, a channel on which a radar event was detected in the last 30 minutes. This 30-minute time can be tracked in the cloud 12. In addition, if deployed in the EU, the optimizer should not use channel 124, the TWDR channel, which would require a 10-minute CAC, and therefore a 10-minute wait period. Note that the 10-minute CAC requirement for this channel does NOT exist in the U.S. or Japan, and channel 124 should be used in the U.S. and Japan. Finally, the optimizer should make sure at least one AP in each home maintains a 5 GHz AP interface on a non-DFS channel (44 or 157 in the U.S.). This will accommodate clients in the home that cannot connect on a 5 GHz DFS channel.

If the optimizer produces the same topology as currently exists in the location, no topology change is initiated.

If the optimizer produces a new topology, the topology change proceeds in two steps. First, the network is placed in a temporary topology using only the 2.4 GHz band. All backhaul links would have to be made on a single 40 MHz 2.4 GHz channel, and all client connections would have to be made on the single 20 MHz control channel for that 40 MHz backhaul channel (performance will not be good, but connectivity will be preserved). Which of the two 40 MHz channels to use could be chosen by looking at the interference levels (not recommended), or a particular channel (say channel 1) could be used for this purpose (recommended). During this time, the 5 GHz interfaces should not be configured/started. The 5 GHz interfaces need to be not sending any beacons, probes, or replying to any probes, etc. They should be silent.

The network spends at least 60 seconds in the 2.4 GHz only configuration while the APs hypothetically perform the CAC. Following the 60 second period in the 2.4 GHz only configuration, the final optimizer preferred topology is deployed. Note that this topology will not include any use of 5 GHz channels that have reported a radar event in the last 30 minutes. Once the optimized topology is deployed, any access points on 5 GHz DFS channels will begin in-service monitoring for radars. If a radar event is detected, the access points which detects the radar event will do the following:

Send a message to the cloud 12 indicating the channel and time of the radar detection (or such message could be just time stamped based on when it arrives in the cloud 12);

Send a CSA to its associated STAs, including any children. The CSA cab simply specify channel 44, the one non-DFS 5 GHz channel available worldwide. It should send this as it does now, with a 15 beacon channel switch count. While it may take longer than 260 ms for this to propagate all the way down the tree, the regulatory requirement is only that we stop the AP(s) that detected radar and their immediate clients within 260 ms. Other APs, and other clients, are free to continue transmitting indefinitely if their APs did not see the radar event. The CSA propagated down the tree may be a bit confusing to APs and clients, as it is possible that there will be no device to connect to on channel 44, but we will let them sort that confusion out on their own by going through recovery if necessary.

Cease transmission on that channel. A hardware implementation may automatically cease transmission on both the STA and AP VAPs. Or, the hardware implementation may not stop transmission the STA VAP.

The access point that detected the radar event, after notifying the cloud and sending its CSA messages, should blacklist the channel with radar for 30 minutes. If the channel with radar was also its link to its parent, the AP should go into recovery, attaching in any way possible without using any of its blacklisted 5 GHz channels.

The radar detection notification to the cloud will become the trigger "Radar Detected," that triggers a new optimization.

Any re-optimizations proceed as just described, the cloud holding the information that a radar event was detected on a particular channel, and providing the information to the optimizer for the next 30 minutes such that the optimizer may avoid use of that channel anywhere in the network.

When a child access point receives a CSA from i's parent, it should pass it down. If the child access point does not find a place to attach on channel 44 when it follows the CSA instruction, it should go into recovery, using any channel to attach except for channels blacklisted in its own radar detected list. It does not need to know or respect the 30-minute holdoff for the channel that its parent detected radar on. Ideally recovery would be onto 2.4 GHz channels only, as then the backhaul and home AP interfaces that are started will be started on channel 44, which does not require DFS. However, if in recovery the AP finds another AP that is operating on a DFS channel, it will attach immediately as a STA (officially OK), and start backhaul and home AP interfaces on that same channel without performing a CAC (not officially OK).

Today, an optimization causes a disruption in the network that lasts just for the time to perform the topology change. And, in many topology changes, only some of the nodes and clients are disrupted. In addition, there is degradation of the performance of a portion of the network during the time discovering the topology deviation and when the optimization is actually performed.

Under this approach, an optimization proceeds in two steps. During the first step a temporary topology is put in place that uses only 2.4 GHz links. This topology stays in place for 60 seconds, during which time performance will be significantly degraded and many clients will have their connections disturbed. Then the network will have to be reconfigured with the final desired topology, creating another period of disruption that lasts for the time required to change the topology of the network. During this time nearly all access points and many clients will need to change their connections Global DFS Approach The following section describes changes to the first approach required to make it fully compliant to the U.S., EU, and Japan regulations, and to address the most serious performance issues. The performance enhancements focus on not perturbing portions of the existing topology if it is not necessary. Whether these changes to address performance issues are justified is a judgement call. In borderline cases this choice is highlighted.

The following lists the steps from the DFS first approach, with the required changes indicated for each step.

An optimization is triggered as currently by one of our existing topology triggers (Scheduled, Topology, Stats Change, Interference, etc.) or by a new trigger "Radar detected". (No change)

The optimizer chooses a new topology. The optimization has an added constraint not to use in the network a channel on which a radar event was detected {for the AP that detected the radar} in the last 30 minutes. This 30-minute time will be tracked in the cloud. In addition, if deployed in the EU, the optimizer should not use channel 124, the TWDR channel, which would require a 10-minute CAC, and therefore a 10-minute wait period. Note that the 10-minute CAC requirement for this channel does not exist in the US or Japan. Finally, the optimizer should make sure at least one AP in each home maintains a 5 GHz AP interface on a non-DFS channel (44 or 157 in the US). This will accommodate clients in the home that will NOT connect on a 5 GHz DFS channel.

A first change, to minimize the number of APs that will need to change channels, only the APs that detected the radar will have the channel on which radar was detected blacklisted in the optimization. This improvement will also preserve more channels for use in different parts of the network, which becomes important in the EU where there are only 3 non-TWDR radar channels. The improvement is only critical if radar detection events are common. Measurements are being made to determine how often radar events happen, and more data can be gathered during the trial. A second change: the optimizer is going to need to start assessing a noticeable penalty to optimizations that change a large number of the APs to a DFS channel, as each of these changes requires a 60 second CAC and more seriously disrupts that part of the network. Exactly how much penalty to apply can be experimented with.

If the optimizer produces the same topology as currently, no topology change is initiated. (No change)

If the optimizer produces a new topology, the topology change proceeds in two steps. First, the network is placed in a temporary topology.

CHANGES: Forcing the topology to be 2.4 GHz only will cause a huge disruption in the network. Nearly all AP and client connections will have to change. And, this happens not only when a radar event has occurred, but would happen on every topology change following an optimization. Therefore, it is advantageous to move to an approach in which the temporary topology connects by 2.4 GHz only the APs that will need to perform a CAC with their 5 GHz radios, and leaves as much of the current/future topology in place as possible. One thought on this: have the temporary topology put all APs into their new locations in the newly optimized tree. Adjust the requested frequencies in the tree as necessary to free the 5 GHz radios of the devices that need to perform a CAC (are changing to a 5 GHz DFS channel), and ensure that children of those devices can connect.

The network spends at least 60 seconds in the 2.4 GHz only configuration while the APs perform the CAC. CHANGES: During the 60 second temporary topology period, the APs that are transitioning to a DFS channel will actually need to perform real CACs, and communicate to the cloud if the CAC fails. Either the AP itself can make the assessment that it needs to provide the CAC, or the cloud can include an indication that a CAC needs to be performed when it communicates the temporary channel. If a CAC fails, it can be treated just like any other radar detection event, resulting in a non-occupancy countdown of 30 minutes, and triggering an optimization via the "Radar Detected" trigger. If a CAC fails, the network will remain in the temporary topology (which is a legal state) while a new optimization is performed with the new radar blacklisting information. The output of this second optimization would be applied through a temporary topology step as just described.

Following the 60 second period in the {temporary} configuration, the final optimizer preferred topology is deployed. Note that this topology will not include any use of 5 GHz channels that have reported a radar event in the last 30 minutes. (No change)

Once the optimized topology is deployed, any APs on 5 GHz DFS channels will begin in-service monitoring for radars. If a radar event is detected, the AP which detects the radar event will do the following:

Send a message to the cloud 12 indicating the channel and time of the radar detection. Ideally, if the AP cannot get confirmation from the cloud of the communication of the radar event before it must cease transmissions, it should store the channel and time of the event locally, in a way that would survive going through recovery. Then, the next time the cloud becomes available, the AP should move information regarding radar events that have not been communicated before. It is critical to do this for events within the past 30 minutes.

Send a CSA to its associated STAs, including any children. For example, the CSA simply specify channel 44, the one non-DFS 5 GHz channel available worldwide. It should send this as it does now, with a 15 beacon channel switch count. While it may take longer than 260 ms for this to propagate all the way down the tree, the regulatory requirement is only that we stop the immediate clients and APs from transmitting within 260 ms. Other APs, and other clients, are free to continue transmitting indefinitely if their APs did not see the radar event. The CSA propagated down the tree may be a bit confusing to APs and clients, as it is possible that there will be no device to connect to on channel 44, but we will let them sort that confusion out on their own. (No change)

Cease transmission on that channel. The hardware implementation may automatically cease transmission on both the STA and AP VAPs. Or, the hardware implementation may not stop transmission the STA VAP. (No change)

The AP that detected the radar event, after notifying the cloud and sending its CSA messages, should blacklist the channel with radar for 30 minutes. If the channel with radar was also its link to its parent, the AP should go into recovery, attaching to the network using a non-DFS channel (channel 44 or 2.4 GHz) only}. CHANGES: There is a need to avoid the case that an AP goes into recovery, finds another AP on a DFS channel, attaches its STA to that AP, and then starts its 5 GHz backhaul and home interfaces on that DFS channel without doing CAC. Two possible solutions are to restrict the recovery attachment to the non-DFS channels, or to allow any attachment (except on the channel where radar was detected for which the AP now has a 30 minute no go period), but locally enforce the CAC before starting AP interfaces. The AP should always be able to connect by 2.4 GHz to the nearest AP.

The radar detection notification to the cloud will become the trigger "Radar Detected," that triggers a new optimization. (No change)

Optimization proceeds as just described, the cloud holding the information that a radar event was detected on a particular channel, and providing the information to the optimizer for the next 30 minutes such that the optimizer may avoid use of that channel anywhere in the network. (No change)

When a child AP receives a CSA from its parent, it should pass it down as is currently done today. If the child AP does not find a place to attach on channel 44 when it follows the CSA instruction, it should go into recovery, {attaching to the network using a non-DFS channel}. It does NOT need to know or respect the 30-minute holdoff for the channel that its parent detected radar on. Ideally recovery would be onto 2.4 GHz channels only, as then the backhaul and home AP interfaces that are started will be started on channel 44, which does not require DFS. However, if in recovery the AP finds another AP that is operating on a DFS channel, it will attach immediately (officially OK), and start backhaul and STA interfaces on that same channel without performing a CAC.

EU DFS

The EU regulatory rules allow several techniques that would be helpful to improve the performance when doing optimizations or reacting to radar events. However, both pre-CAC and remote sensor can help minimize the performance impacts of DFS when operating in Europe.

Pre-CAC is the ability to perform a CAC on a channel ahead of time. If the CAC passes, the channel is marked as available. In the future, this channel can be switched to and operation can start immediately, without performing another CAC. In-service monitoring must begin immediately upon operating in the channel. Amazingly, the pre-CAC based availability status remains indefinitely, until an actual radar event is seen on that channel. This allows performance of CACs on all the channels once, perhaps late at night when the network is idle, mark all channels as available, and have free reign on all optimizations without having to do CACs to move into those topologies. Note that if a radar is found during operation, following a 30-minute hold-off, that channel would need to be pre-CACed again (perhaps late at night) before a switch to that channel and start using it immediately following an optimization.

Remote sensor potentially allows the use just one AP in the network to do the radar detection (both CAC and in-service monitoring) for the entire location. This would potentially allow two advantages:

The pre-CACing as described above could be performed with only one AP taken off line, allowing the network to operate in nearly a normal mode even during the late night period when the pre-CACing is being performed Only one AP might be used to monitor for radar events. This will significantly reduce (by a factor of 6 typically) the radar false alarm rate in the network, reducing the frequency of the disruptions that radar events trigger. However, this technique requires a very fast local communication system, as if the sensor AP discovers a radar, all devices in the location must cease transmitting on that channel within ~200 ms. Such fast reaction could not be reliably be assured through the cloud, particularly considering the solution would have to work in the event the cloud was disconnected.

Considering the above features, EU phase 1 DFS would proceed as follows:

1. During initial (first day) startup, the network might simply make use of only non-DFS channels. Or, it might follow the procedure outlined for Global DFS. Performance would be better (neglecting the 60 s CAC time) using the Global DFS technique, and it might not be much more effort as we need to build that in any case.
2. During the first night, the controller would take the 5 GHz radio of the leaf AP with the fewest associated clients offline, connecting that AP to the network via 2.4 GHz. That AP would then perform CACs on all four DFS channels (three 1-minute CAC channels, one 10 minute CAC channel, for a total absence of ~13 minutes), and communicate the result to the cloud.
3. The cloud would communicate those CAC results down to each AP, and to the optimizer whenever an optimization is run for that location.
4. The optimizer would respect the CAC result whenever it is run. There would no longer be a reason to weight against the use of DFS channels.
5. The results of any optimization would be deployed immediately, without an intermediate topology, and without performing additional CACs.
6. All APs would enable in-service monitoring on any DFS channel on which they are operating.
7. If a radar is detected by an AP on a particular channel, that AP would notify the cloud of the event and go into recovery as in the Global DFS solution. Persisting the event through recovery for eventual reporting to the cloud if the cloud were unavailable would be important just as in the Global DFS solution.
8. The AP that detects radar would issue a CSA just as described in the Global DFS solution.
9. Following the detection of radar, optimization will be triggered, and use of that channel would be blocked in the optimizer for the AP that had detected the radar. The new optimized topology can be deployed immediately, as all APs would be pre-CACed already for any new frequencies. This includes the AP that found the radar, as that AP will not be asked to operate on the channel on which it observed radar, and the pre-CAC status that it has of all other channels would still be valid.
10. Late the night of the day with the radar event, at least 30 minutes after the radar event had occurred, the controller would again ask the leaf AP with the fewest associated clients to perform a pre-CAC of the channel on which one of the APs detected radar. The entire sequence would be repeated starting at step 2.

EU Phase 2 is very similar to EU Phase 1, but adds the ability to have only one AP do the in-service monitoring. This enhancement is only necessary if radar false alarm events prove to be frequent, in which case significantly reducing the number of APs performing radar detection will significantly reduce the frequency of having to react to radar events.

The flow is identical to the steps in EU Phase 1, with the following changes: After a topology is deployed, only a single nominated AP in a location will perform in-service monitoring. Presumably this will be the same AP as was selected to perform the pre-CAC. If a radar event is found, along with notifying the cloud, the AP acting as a sensor must notify all other APs in the location of the event. It must complete this notification within ~200 ms.

Global DFS Design

The intent is for the Global DFS solution to satisfy the DFS requirements in the US, EU, and Japan. Only small differences in each region relating to the channels used, and the timing of the channel availability check are required.

Definitions

CAC: Channel Availability Check—the time that a device must listen for radar on a channel before beginning transmissions.

IsM: In-service Monitoring—listening for radar while operating.

Nodes: refers to wireless infrastructure devices such as with an agent (APs, gateways, routers).

Temporary topology: A topology deployed while CACs are being performed.

Final topology: The desired topology as the result of an optimization. This topology is deployed after all nodes successfully complete any required CACs.

Current topology: The topology operating at the time of the optimization. Note, this is not necessarily the topology output from the previous optimization. Due to topology deviation, it might be different.

Unavailable: Unavailable/Unavailability refers to a channel that is within 30 minutes of having a radar detected on that channel. During that time no transmissions can be made by the node that detected the radar on that channel. This also goes by "channel non-occupancy time."

Non-Occupancy List (NOL): List of channels that are unavailable at any given point in time on any specific AP.

non-DFS channel: a frequency channel that does not require radar detection (2.4 GHz channels, 44, and in the U.S., channel 157)

DFS channels: Channels that require DFS, (60, 100, 124, and in the U.S. 132 as well)

The following is the sequence of events that is required for the Global DFS solution.

Onboarding—During initial network setup, devices should operate only on a default set of non-DFS channels. The default channels can be Ch. 1 in the 2.4 GHz band or channels 44, 100, 157 in the 5 GHz band.

Devices go through an on-boarding process using these channels. As they are non-DFS channels, operation on channel 1, channel 44, and channel 157 (in the U.S.) can begin immediately. This includes enabling STA, backhaul, and home AP interfaces. In the EU and Japan, the 5 GHz radio has only channels requiring DFS available to it. In these domains, during on-boarding the 5 GHz radios should only have their backhaul interfaces activated on channel 100. This will allow the 1-minute CAC to begin immediately. Any optimization that occurs after the completion of this CAC can potentially use this channel as part of the optimization. The STA and home interfaces on channel 100 should not be started automatically, even after the CAC completes. These interfaces can be enabled as appropriate later from the cloud after an optimization occurs following the completion of the CAC.

Topology deviation triggers of the optimizer can occur repeatedly during on-boarding as nodes connect to one another, and partial topologies are applied. It would be particularly disruptive for devices to perform new 1-minute CACs during this time. Therefore all optimizations should use only non-DFS channels until either all APs in the account have connected to the cloud, or a timeout following the on-boarding of the first device is reached.

An optimization is triggered by an existing optimization triggers (Scheduled, Topology Deviation, Stats Change, Interference, etc.) or by a new trigger "Radar detected." While most radar detection incidents will result in some sort of topology deviation which would trigger an optimization anyway, having a new radar detected trigger will make it clear in the Network Operations Center (NOC) and historical records why the topology deviation occurred.

The optimizer chooses a new topology. This is the "final topology" desired. The optimization proceeds with the following added constraints:

The optimization must not use in the network a channel that is unavailable on a given node. APs will provide (via Open vSwitch Database (OVSDB)) the list of non-occupancy channels. Any channel in this list must not be used on that AP for uplink (STA), home (AP) or backhaul (AP) interfaces.

In the EU, channel 124 requires a 10-minute CAC. This extremely long CAC would be particularly disruptive during the day when networks are in use. Therefore, in the EU, the optimizer may not ask any node which is not already operating on channel 124 to switch onto channel 124, unless the optimization is a nightly (scheduled) optimization, or all other potential channels for the 5 GHz radio (e.g., channel 100 in the EU) are unavailable due to radar detection. In other words, for triggered optimizations, the optimizer should never ask a device to switch onto channel 124, unless a radar event occurred on channel 100, and the radio is still in the non-occupancy period. On the other hand, devices that are already operating on channel 124 (and have not detected a radar event there) can be allowed to operate on that channel as part of the optimization.

The optimizer should ensure that at least one home AP interface in the 5 GHz band exists on a non-DFS channel. This will accommodate clients in the home that will NOT connect on a 5 GHz DFS channel.

If the optimizer produces the same topology as currently, or finds very little benefit from changing the topology, no topology change is initiated.

If the optimizer produces a new topology, the topology change proceeds in two steps. First, the network is placed in a "temporary topology." This temporary topology has several competing goals:

Free the 5 GHz radios that must perform a CAC in order to switch into the final topology
Maintain network connection to all nodes
Minimize the disruption to the network when transitioning to the temporary topology and the final topology.
Keep the network in the best possible operation during the period in which the CAC is being done (low priority)

The optimizer module should determine this temporary topology. It could use another Gurobi optimization cycle with the correct constraints for the temporary topology. Or, a temporary topology could be determined in a more algorithmic/heuristic way. Given that the performance while in the temporary topology is not that important, it would be nice to save the time and expense of another full Gurobi optimization. The temporary topology optimization would proceed with all the constraints of the "final topology" as listed above, with the added steps/constraints of:

1. The desired final topology is compared to the current topology. Radios which are being requested to move onto a DFS channel are identified. These are radios that were not operating on the desired DFS channel in the current topology, but are desired to be operating on that channel in the final topology. (Note: the current topology is not necessarily the topology output from the previous optimization. Due to topology deviation, it might be different. The optimizer is already handles this correctly.) If there are no radios that need to move onto a DFS channel, no temporary topology is required. The optimizer should then deliver only the final topology to the controller and this topology can be deployed immediately. If there are radios that need to be moved onto a DFS channel, then the temporary topology must be built and provided to the controller.
2. New constraints are added for the temporary topology: The radios that must perform CACs cannot be used for any parent/child or client links. These are the radios identified in step 1 above. These radios should be specified in the topology JSON with their backhaul AP on, and the channel set to the DFS channel needing the CAC.

It is desired that radios that will be on the same DFS channel in the final topology as they are in the current topology should remain on that channel through the temporary topology. There are two reasons for this. First, it is officially a regulatory requirement, as if you move off channel, even for only a minute, and stop doing in-service monitoring, you are not supposed to go back to that channel without performing a new CAC. Second, it will create more disruption in the network to be switching around those channels anyway.

Generally, it would be desirable to have as few changes as possible going from the current, to temporary, to final topology. This is probably more important than maximizing performance during the temporary topology stage.

The optimizer provides back to the controller BOTH the temporary and final topology when DFS channel changes are present—otherwise, only final topology is required, and a temporary topology does not need to be generated.

When a temporary topology is also provided, then the following steps should be applied:

1. Configure Wifi_Radio_Config.next channel on each node. This value—based on the radio—should be set to the same "initial" channel listed in the table above. In cases were radio is off initially, this can be left unset.
2. Apply the temporary topology change
    1. For radios being changed to a DFS channel, only backhaul AP VIF should be added—no home or STA VIFs—as if optimizer provided vaps=bhaul
    2. If temporary topology change fails, trigger a topology deviation optimization which should result with returning to step 2 above
3. Start a 3 minute timer (15 minutes if the topology included channel 124): If it goes off, trigger a topology deviation which should result in returning to step 2 above (3/15 minutes provides ample time for 1/10 minute CAC)
4. Once all nodes which are configured with a DFS channel have Wifi_Radio_State.cac_state==done, then stop timer and apply the final topology change
5. If any node disconnects and re-connects due to going through recovery and does not report a radar event (before applying final topology), trigger a topology deviated optimization which should result in returning to step 2 above (this can be detected by radio channel going back to previous default, and cac_state becoming "idle")
    1. If the timer is still running, it should be canceled
6. If any node reports a radar event via Wifi_Radio_State.radar (before or after applying final topology), trigger a radar detected optimization which should result in returning to step 2 above
    1. If the timer is still running, it should be canceled Node's Radios which are being changed to a DFS channel require that an AP VIF must already exist before updating Wifi_Radio_Config.channel to the desired DFS channel, or an AP VIF must be inserted immediately afterwards. The Node will provide CAC status in Wifi_Radio_State.cac_state which will have the following possible values (enum):

"idle" means no CAC is in progress, and one is not needed (i.e. currently on non-DFS channel or no AP VIF exists)

"in-progress" means CAC is in progress on currently configured DFS channel "done" means CAC has completed successfully and radio is now usable Radar Detection (During CAC or In-Service Monitoring)

If radar is detected during the CAC period, then the following will occur:

Wifi_Radio_State.radar will be updated with channel number, time stamp, and the count will be incremented Wifi_Radio_State.channel will be updated to whatever channel the node moved to upon detecting the radar (should be Wifi_Radio_Config.next channel if provided)

Wifi_Radio_State.cac_state will reflect the state of the newly moved to channel, i.e. "idle" if it was a non-DFS channel When the controller (cloud 12) receives a radar event—whether going through the two-stage topology change process or not, it should trigger a radar detected optimization.

The node will maintain locally its own non-occupancy channel list, and deal with the related timers. This list must survive all standard forms of recovery except for reboots (healthcheck or user initiated), or power-cycles. The cloud 12 may not maintain/duplicate this state or the related timers. Rather it will read this state through the OVSDB cache in the cloud for all purposes.

The node will send notification to the cloud when a radar detection occurs. If uplink is not using the radio which received the radar event, it will be immediate. Otherwise, it will be after an AP has gone through recovery.

A node will automatically switch to a new channel upon detection of radar. This channel can be configured using Wifi_Radio_Config.next channel. If that is not provided, or the channel given is not available, the node will pick a new channel on it's own. Note, the new channel—when picked by the node—may be a new DFS channel, in which case the Wifi_Radio_State.cac_state will reflect the new channels CAC state.

The CSA beacon count used when changing to a new channel after a radar event must take into account the regulations of total transmit time being no more than 260 ms, with 200 ms completed in the first second, and ~60 ms across another 9 seconds for a total of 10 seconds.

If a node is connected to its parent on a channel different from the channel on which the radar is detected, the node may continue to operate as an STA, connected to its parent on the channel it had been using. Nodes further down the tree will follow the CSA that was issued, and the entire tree will remain connected.

If a node detects radar on the same channel to which it is connected to its parent, it should cease operation as an STA on that channel and go into recovery. It could be argued that operation on the channel should still be allowed if the parent had not seen the radar (and not sent a CSA). The STA interface on the child is operating as a DFS slave, so should be allowed to operate as long as its parent has not detected radar. However, there are three reasons that we should stop operation of the STA interface on a node if radar is detected on that channel:

Proving proper operation of the DFS system if the STA interface continues to operate will be difficult. And, any independent tests of DFS operation are likely to raise suspicions that the DFS rules are not being abided.

The FCC has not accepted the notion of a device that is both a slave and a master. It could take a while to get them to accept this concept.

In many cases we will want an AP interface on the channel that is connected to the parent anyway. So, it may not provide a lot of benefit to remain connected to the parent on that 5G parent, but unable to connect to children or clients on that channel.

If a node needs to stop operation on its STA interface, it should go into recovery.

The cloud 12 can save a long-term record of radar events so it can be analyzed off line to understand patterns of radar events. At a minimum this record should include the time of the radar event, the node on which the radar event occurred, and the frequency channel on which the radar event occurred. If the driver provides any additional details about the radar event, for example signal strength, we would want to save that information as well. In addition, the data pipeline/controller needs to be sure to "catch" these events from the cloud OVSDB cache as they occur, since the cache is transitory. This can probably be done each time the cloud reacts to a radar trigger event, as all radar events should generate a trigger, and the cloud should react quite quickly to all of radar events triggers.

Recovery

Nodes can lose their connection to their parent and thus the cloud from a variety of causes:

Failed topology deployment (they can't get connected when commanded)

Topology deviation (they just fall off)

Parent disappearance (the parent disappears without the child having received a CSA)

Radar detected on the same channel as is used to connect to the parent

If a node loses connection to its parent briefly, it will try to reconnect to where it was, on the channel it was on, and will leave its backhaul and home APs active. In this case, if reconnection is successful, and a radar event has not occurred on the channels in question, then it can continue to operate, even in DFS channels, as it does today. However, if the node loses connection with its parent and cannot re-establish that connection quickly, or if it cannot re-establish connection due to a radar event, it will go into recovery. During recovery, the backhaul and home AP interfaces are taken down. The AP also will search all channels for a way to connect.

When a node goes into recovery, for whatever reason, including a radar event, the node will:

Attach to any parent node it can find, on any channel that is not recorded as unavailable within the node (i.e. non-occupancy list). The device should only perform active probing on DFS channels after it has seen a beacon.

If a radar event happened before reconnecting to the cloud, this info should be pre-populated in OVSDB Upon reconnecting, the controller can enable backhaul and home APs on non-DFS channels, as described in the section on initial on-boarding (step 1).

The controller should trigger a new optimization on the basis of radar detected or topology deviation, returning to the start of step 2.

Potential Enhancements/Options to Consider

Restrict optimizer to choose a new DFS channel (one that requires CAC) only for nightly optimizations. Otherwise strongly weight the optimizer not to choose a new DFS channel except in nightly optimizations.

Turn on 5U using channel 100 immediately during onboarding or recovery for countries where channel 157 isn't available. Controller can bring up backhaul and home AP's like normal, and they will become active once CAC completes. If radar is detected and thus CAC fails, the device will automatically move to another channel on its own and update Wifi_Radio_State.nol list of channels that have been blacklisted.

Ideally the optimizer would start assessing a noticeable penalty to optimizations that change DFS channels, unless those are nightly optimizations, or a radar event has occurred and only DFS channels are available.

Is there an easy way to choose temporary and final topologies that minimize changes in the network? This can be added as a weight in the optimization function.

The sophistication level of the "next channel" selection could vary. For simplicity this could be left out entirely, as the nodes themselves will move to an available channel, and reform the network through recovery. A quicker and smoother transition could be facilitated by specifying next channels. The simplest specification would be to use always the default starting channels. In the EU and Japan this includes channel 100, which might be unavailable due to a recent radar event.

Key EU Regulatory Aspects

In the EU, there are only four 80 MHz 5 GHz channels available. There are six in the U.S., but the highest two 80 MHz frequency bands in the U.S. are not available for use in Europe. The EU 80 MHz 5 GHz channels have the following DFS requirements:

Channel 44 (5170-5250 MHz, channel 36-48, control channel on 44): This channel does not require DFS of any type.

Channel 60 (5250-5330 MHz, channel 52-64, control channel on 60): This channel requires DFS with a one-minute Channel Availability Check (CAC)

Channel 100 (5490-5570 MHz, channel 100-112, control channel on 104): This channel requires DFS with a one-minute CAC Channel 124 (5570-5650 MHz, channel 116-128, control channel on 124): This channel requires DFS with a ten-minute CAC The AP 14 can be constructed such that the 2×2 5 GHz radio operates on the lower half of the 5 GHz band only (5L, channels 44 and 60 listed above), and the 4×4 radio can operate only in the upper half of the 5G band (5U, channels 100 and 124 listed above). Therefore, DFS must be enabled in order to use the 4×4 radio in the AP 14 at all.

CAC, Pre-CAC, and Off-Channel CAC

EU regulations require that before making a transmission in a channel requiring DFS, that the radio listen for radars for at least one minute (10 minutes in channel 124 as described above). If this measurement is done continuously, immediately before operating in the channel, it is called the Channel Availability Check (CAC). This is the only type of CAC allowed in the U.S.

However, the EU allows two other types of CAC operation. Pre-CAC allows an AP to perform the CAC, mark the channel as available, go off and operate on a different channel, and potentially return and begin operating immediately on the pre-CAC'd channel. Note that the EU regulations do not use the term pre-CAC, as they consider all CACs to enable this operation. In other words, in the EU regulations, all CAC's are considered to be pre-CACs. The time over which a channel can be considered "pre-CAC'd" is indefinite. Even if it has been a year since a particular channel had a CAC, it is still considered available, and operation can begin immediately on that channel without an additional CAC. This represents a great benefit, and is a reason that we may not want to try to constrain our DFS algorithms to be the same for the U.S. and for the EU.

The EU also allows an "off-channel CAC." This sometimes called a duty cycle CAC. It allows the total one-minute listening time to be built up out of much shorter listening periods spaced apart in time. Hypothetically this allows an AP to perform a CAC on a channel while operating on a different channel, by making brief off-channel scans of the channel for which the CAC is being performed. Note that the AP must still pass the radar detection tests while doing this off-channel CAC.

If a radar is detected during any type of CAC operation, the channel should be marked as unavailable. An unavailable channel cannot be used for the non-occupancy period of 30 minutes. After that time has elapsed, one of the CAC methods may be done to once again make that channel and available channel.

In-Service Monitoring

Whenever the AP is operating on a channel requiring DFS, it must look for radars, and if one is detected, it must shut down the channel, mark the channel as unavailable for a period of time equal to the non-occupancy time (30 minutes), and ensure a new CAC is done after the 30 minutes before operating on that channel again.

Channel Shut-Down

If radar is detected during in-service monitoring, the AP is required to switch to an available (or non-DFS) channel, and ensure that the clients associated to the AP stop transmissions in the channel where the radar was detected. In order to minimize disruption, and maximize the chance that clients stop transmitting quickly, it is best to propagate a Channel Switch Announcement (CSA) all the way down the tree. A key aspect of this is how quickly the AP must ensure the termination of transmissions.

The allowable channel shutdown time is a little complicated. First, the EU regulations have two different time limits that come into play. First, there is a "Channel Move Time" which is the time after which there should be no more transmissions on the channel where the radar was detected (all the devices should have moved off channel). This time limit is 10 (ten) seconds.

Second, the EU regulations specify the amount of air time that can be consumed by all transmissions during that channel move time. This is called the "Chanel Closing Transmission Time." This limit is 1 (one) second. The regulations explicitly state that this total does not include the quite periods in between transmissions. Note that this limit is ~260 ms in the US, significantly lower, and potentially another reason for DFS methods to differ between the US and the EU.

Third, in the proposed approached herein, all APs are doing in-service monitoring. Officially, only the AP that detects the radar, and the clients associated with it, need to move to another channel. Other APs within the network, operating on this same channel, which do not detect a radar, do not need to vacate the channel. As a corollary, APs further down the tree and their clients, which we will likely need to change the channel of just to maintain network connection, do not need to meet the time limits shown above for either the Channel Move Time, or the Channel Closing Transmission Time. This is important as 90%+ of radar detections will be false alarms due to noise/interference/Wi-Fi signals that mistakenly look like radars. Therefore, in most circumstances, the other APs operating on a radar channel will not detect radar at the same time.

Radar Detection by a Secondary Device

A recent addition to the EU rules is the allowance for an AP to rely on an associated device to perform radar detection. The rule reads as follows: "The master device may rely on another device, associated with the master, to implement the Radar Interference Detection function. In such a case, the combination shall comply with the requirements applicable to a master." It is unclear if we can extend this to the entire multi-hop network. As written, it seems to imply it can only go one hop, as the two devices must be associated.

Assuming the association limitation applies, AP could use the CAC from its parent, or any one of its children. While this could be helpful, there is added complication in keeping track of parents and children, etc.

Proposed Algorithm Overview

Considering the regulatory rules listed above, and the AP 14 hardware, the following is a proposal for the DFS algorithm. The main elements are:

- Each AP will keep a list of available channels (channels that have passed a CAC or pre-CAC). This list will be synchronized to the cloud (controller) via OVSDB entries. The 5L radio will have channel 44 which is always available (DFS not required), and may have channel 60 available. The 5U radio will indicate any of channel 100 and channel 124 that are available.
- Each AP will also keep a list of channels that are within the non-occupancy time window. This will also be synchronized to the cloud via an OVSDB entry. Only the AP will need to keep track of time. When the 30 minutes has expired, the channel will be removed from the non-occupancy list. It may be that the non-occupancy list needs to persist through a reboot/power cycle of the device.
- When invoked, the optimizer will factor which channels are available on which APs in the optimization, such that the output should be realizable by the current channel availability state.
- APs have the ultimate responsibility not to operate on an unavailable channel, or to perform a CAC on a channel that is in the non-occupancy state. If they receive a request to do so, they will go into the recovery state, and connect to the network either on channel 44, or on a 2.4 GHz channel. Such recovery should be observed as a topology deviation and trigger a re-optimization, hopefully with the correct constraints.
- The controller will trigger APs to perform a CAC/pre-CAC. However, before requesting a CAC, the controller, with help of the optimizer, should deploy a topology that will at least keep the network fully connected while the CAC is going on. To the extent possible, CACs of unavailable channels should be done at the same time, in a period of very low usage (middle of the night).
- The APs will react to radar alarms autonomously, as described in more detail below. However, such reaction should appear as a topology deviation, and should trigger a re-optimization with the new channel availability factored.

Additional Algorithm Details

During onboarding, 5L radio should operate on channel 44. Channel 44, or 2.4 GHz channels should be used to form the initial topology as if the devices were going through recovery. At this point Channels 60, 100, and 124 will be marked as unavailable as no CAC has taken place. Therefore, the 5U radio cannot be used to make connections at first. Rather the 5U radios should all be performing a CAC on channel 100, which requires a 1-minute CAC. After about a minute, most/all of the APs will have channel 100 marked as available. Since typically multiple rounds of optimization are occurring as the network starts up, channel 100 will be found to be available and used by the optimizer eventually.

Hidden SSID

The backhaul connections operate with hidden SSID. Therefore, there are beacons that devices can see, but they have the SSID nulled. In order for the APs 14 to know this is the correct SSID to connect to, the APs need to send an active probe. By seeing the beacons the APs know it is safe to transmit on that DFS channel. They can then send an active probe to discover the SSID.

Recovery

When in recovery, an AP should connect as a child to any AP it can find on a channel which is in its availability list. Keep in mind that 2.4 GHz channels, and channel 44, are always available.

Pending clarification with the EU regulators, it may be possible for an AP to inherit the availability of channels from its parent. In this case an AP can connect as a child, and begin beaconing as an AP, on any channel which it sees beacons on. In this simple form, it would require the regulators to allow propagation of available channels through multiple hops. Otherwise a more complicated gating of starting beacons would be required.

CAC Scheduling

Given the infinite life of a pre-CAC in the EU regulations, a CAC is only required if:

- The device has recently been powered up and has not completed a first round of CACs
- The device had detected radar, marked a channel as non-occupancy, and the non-occupancy time (30 minutes) has expired. At this point a CAC on that channel is required to make it available again There are several options for scheduling CACs. For all of the options, on power on/on-boarding, it is likely that the 5U radio does a CAC in channel 100 immediately. For subsequent CACs the options are:

- CACs are scheduled only at night, and only after the network is configured into a state that is agreeable with the CAC that is being done. This has the advantage of disrupting the network the least. However, it presumes that radar alarms are rare events, and that it would be extremely rare for an AP to have more than one radar event in a single day. It may also degrade the quality of the optimizations due to limited choices, and the lower quality optimizations would have to run an entire day.
- CACs are run as soon as a non-occupancy time expires. This will tend to "fix the problem: as soon as possible, but will be more disruptive. Also, keep in mind the network will have already had to run for 30 minutes "with the problem."
- A hybrid of the two above. Perhaps CACs should generally be run only at night, but in the case that both channels have been lost due to radar alarms, an immediate CAC would be started. Or, the optimizer could make a recommendation that a CAC should be done because it is having trouble getting a good topology with the channels available. This approach has the best performance, but is more complicated to design and implement.

Radar Alarms

Perhaps the most complicated aspect of the DFS algorithm is what to do when a radar alarm occurs. The time frames involved (10 seconds to complete the channel movement, 1 second of radio transmissions while making the transition) will allow propagation of CSA through even a quite deep chain of APs. However, it is too short to depend on cloud interaction. Additionally, networks need to operate even if the cloud is not connected, so it is best if a reaction to a radar alarm occurs without any connection to the cloud.

The point of doing the pre-CACs is so that the network can react and recover quickly from a radar event.

Reacting to a radar alarm that occurs on a channel being used only to connect to clients (channel is being used only for the Home AP VAP) is straightforward. A given client should be able to work on any of the DFS channels equally well. (A few clients do not operate on DFS channels at all. See the discussion below.) Therefore, the AP can send a CSA to the clients to change channels to the other DFS channel (or a non-DFS channel) and switch using the CSA in the normal way.

Similarly, if a radar alarm occurs on a channel being used to connect to children and clients only, the AP can assume that the downstream APs (children+) all have availability on all DFS channels due to having pre-CAC'd them. It can therefore send a CSA down through the rest of the tree and change channels within the same band to the other DFS channel, or a non-DFS channel.

The complication arises when an AP detects radar on a channel that is also being used to connect to the parent. In this case, changing channels will cause the AP to become disconnected from its parents. A couple of approaches could be taken:

- The AP should send a CSA downstream to its clients and children, just to make sure they exit the channel and stop transmitting. The channel specified would be the other channel in the same band. Device won't operate in that band unless it is on their availability list, so there is no concern about the devices violating regulatory rules when they go there. However, there may not be anything for them to connect to when they get there. The AP, and likely its clients and children, would then go into recovery mode.
- Hypothetically, the STA interface on the AP can continue to operate as a DFS slave to the AP's parent. Logically speaking, this STA interface is not detecting radar, and since the AP to which it is connected (the parent) did not detect radar, it is appropriate for it to continue to operate as an STA connected to that AP. The AP would therefore keep its STA interface connected to its parent, but would send a CSA to its children and clients, requesting they move to another band—for example the 2.4 or other 5G band. The AP would then mark the original channel on which radar was detected as non-occupancy and count down the 30 minutes. After that, a new CAC might be done to restore the channel at some point. Also, the AP triggered CSA to a different band will look like a topology deviation, triggering a new optimization.

Clients that do not Support DFS Channels

There are a relatively small number of clients that do not support DFS channels. Several approaches could be taken for these devices

- Assume the devices will connect on 2.4 GHz, and receive adequate performance, if only 5G DFS channels are available to them
- Force all optimizations to have at least one home interface in 5 GHz on a non-DFS channel. Gamble that they will be able to reach this AP from wherever they are in the house (or connect more locally on 2.4 GHz)
- Detect if such client is present, and only in that case force the optimizer to include a non-DFS 5G home channel It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Wi-Fi system comprising:
    a plurality of access points each configured to operate on a plurality of channels including Dynamic Frequency Selection (DFS) frequency channels and non-DFS frequency channels; and
    at least one access point of the plurality of access points is connected to a controller, wherein the controller is configured to coordinate usage of the plurality of channels between the plurality of access points including usage of the DFS frequency channels pursuant to predetermined DFS rules,
    wherein an access point of the plurality of access points performs a DFS Channel Availability Check (CAC) measurement prior to a deployment of a topology, based thereon, defining client and backhaul wireless links for the Wi-Fi system, the deployment of the topology including assignment of the plurality of channels for the client and backhaul wireless links, and wherein the plurality of access points are arranged in a start-up topology defining both of the client and the backhaul wireless links, the startup topology only using non-DFS frequency channels that allows radios to make the DFS CAC measurement prior to the network being reconfigured subsequent to the DFS CAC measurement into a fully optimized topology that makes use of the DFS frequency channels.

2. The Wi-Fi system of claim 1, wherein the plurality of access points are in a distributed Wi-Fi system utilizing the plurality of channels for backhaul links between the plurality of access points and client links between each access point and corresponding client devices.

3. The Wi-Fi system of claim 1, wherein the DFS measurements are provided to the controller.

4. The Wi-Fi system of claim 1, wherein one or more access points of the plurality of access points are configured to perform DFS in-service monitoring and the results of the DFS monitoring are provided to the controller.

5. The Wi-Fi system of claim 1, wherein the predetermined DFS rules include switching off a DFS frequency channel for a predetermined time period responsive to detection of radar.

6. The Wi-Fi system of claim 1, wherein multiple access points of the plurality of access points perform the DFS CAC measurement prior to the deployment of the fully optimized topology and each of the multiple access points votes on detection of radar on the DFS frequency channels.

7. The Wi-Fi system of claim 1, wherein a Channel Switch Announcement (CSA) is propagated among multiple access points of the plurality of the access points.

8. The Wi-Fi system of claim 1, wherein the controller is a cloud controller communicatively coupled to the at least one access point via the Internet.

9. The Wi-Fi system of claim 1, wherein the controller is configured to use only a subset of the access points for DFS measurements pursuant to the predetermined DFS rules.

10. The Wi-Fi system of claim 1, wherein the plurality of access points are arranged in the topology that includes assignment of the plurality of channels, and wherein, prior to a DFS CAC measurement, the topology includes each access point being taken out of the topology to perform the DFS CAC measurement.

11. The Wi-Fi system of claim 1, wherein the plurality of access points are arranged in the topology that includes assignment of the plurality of channels, and wherein the controller is configured to maintain a list of the plurality of channels that have Channel Availability Check (CAC) measurements.

12. A controller comprising:
an interface communicatively coupled to one or more Wi-Fi systems each including a plurality of access points each configured to operate on a plurality of channels including Dynamic Frequency Selection (DFS) frequency channels and non-DFS frequency channels;
a processor communicatively coupled to the network interface; and
memory storing instructions that, when executed, cause the processor to
coordinate usage of the plurality of channels for each of the one or more Wi-Fi systems including usage of the DFS frequency channels pursuant to predetermined DFS rules, wherein, in each Wi-Fi system, at one access point of the plurality of access points performs a DFS Channel Availability Check (CAC) measurement prior to a deployment of a topology, based thereon, defining client and backhaul wireless links, the deployment of the topology including assignment of the plurality of channels for the client and backhaul wireless links, and wherein the plurality of access points are arranged in a start-up topology defining both of the client and the backhaul wireless links, the startup topology only using non-DFS frequency channels that allows radios to make the DFS CAC measurement prior to the network being reconfigured subsequent to the DFS CAC measurement into a fully optimized topology that makes use of the DFS frequency channels.

13. The controller of claim 12, wherein each of the one or more Wi-Fi systems includes a plurality of access points utilizing the plurality of channels for client links between each access point and corresponding client devices.

14. The controller of claim 12, wherein one or more access points of the plurality of access points are configured to perform DFS measurements for a Channel Availability Check (CAC) and the DFS measurements are provided to the controller.

15. The controller of claim 12, wherein the controller is a cloud controller communicatively coupled to the one or more Wi-Fi systems via the interface which is a network interface.

16. A method comprising:
operating a Wi-Fi system including a plurality of access points each configured to operate on a plurality of channels including Dynamic Frequency Selection (DFS) frequency channels and non-DFS frequency channels;
performing a DFS Channel Availability Check (CAC) measurement by at one access point of the plurality of access points prior to a deployment of a topology defining client and backhaul wireless links of the Wi-Fi system, the deployment of the topology, based thereon, including assignment of the plurality of channels for the client and backhaul wireless links; and
coordinating usage of the plurality of channels between the plurality of access points including usage of the DFS frequency channels pursuant to predetermined DFS rules,
wherein the plurality of access points are arranged in a start-up topology defining both of the client and the backhaul wireless links, the startup topology only using non-DFS frequency channels that allows radios to make the DFS CAC measurement prior to the network being reconfigured subsequent to the DFS CAC measurement into a fully optimized topology that makes use of the DFS frequency channels.

17. The method of claim 14, further comprising
performing DFS measurements for a Channel Availability Check (CAC) by one or more access points of the plurality of access points.

18. The method of claim 14, wherein the plurality of access points are arranged in a topology that includes assignment of the plurality of channels, and further comprising
maintaining a list of the plurality of channels that have Channel Availability Check (CAC) measurements.

* * * * *